(12) United States Patent
Besser et al.

(10) Patent No.: US 10,158,233 B2
(45) Date of Patent: Dec. 18, 2018

(54) MULTI-SOURCE, MULTI-LOAD SYSTEMS WITH A POWER EXTRACTOR

(71) Applicant: XSLENT Energy Technologies, LLC, Novato, CA (US)

(72) Inventors: David A. Besser, Bakersfield, CA (US); Stefan Matan, Jr., Novato, CA (US); Melvin James Bullen, Los Gatos, CA (US)

(73) Assignee: XSLENT Energy Technologies, LLC, Novato, CA (US)

( * ) Notice: Subject to any disclaimer, the term of this patent is extended or adjusted under 35 U.S.C. 154(b) by 119 days.

(21) Appl. No.: 15/058,977

(22) Filed: Mar. 2, 2016

(65) Prior Publication Data
US 2016/0181808 A1    Jun. 23, 2016

Related U.S. Application Data

(60) Division of application No. 11/849,242, filed on Aug. 31, 2007, now Pat. No. 9,431,828, which is a
(Continued)

(51) Int. Cl.
| | |
|---|---|
| *H02J 3/38* | (2006.01) |
| *H02J 1/00* | (2006.01) |
| *H02J 7/00* | (2006.01) |
| *H02J 7/35* | (2006.01) |
| *H02M 7/44* | (2006.01) |

(52) U.S. Cl.
CPC ............... *H02J 3/382* (2013.01); *H02J 1/00* (2013.01); *H02J 3/383* (2013.01); *H02J 3/385* (2013.01); *H02J 3/386* (2013.01); *H02J 7/0052* (2013.01); *H02J 7/0068* (2013.01); *H02J 7/35* (2013.01);
(Continued)

(58) Field of Classification Search
CPC ................................. H02J 1/00; Y02E 10/56
USPC ....... 307/24, 43, 109, 113, 126, 99; 323/293, 323/234
See application file for complete search history.

(56) References Cited

U.S. PATENT DOCUMENTS

| | | |
|---|---|---|
| 3,384,806 A | 5/1968 | Hartman |
| 4,204,147 A | 5/1980 | Larrabee |
| (Continued) | | |

FOREIGN PATENT DOCUMENTS

| | | |
|---|---|---|
| DE | 19618882 A1 | 11/1997 |
| EP | 0591620 B1 | 9/1999 |
| (Continued) | | |

OTHER PUBLICATIONS

Advisory Action for U.S. Appl. No. 11/849,242, dated Sep. 18, 2015, 3 pages.
(Continued)

*Primary Examiner* — Adi Amrany
(74) *Attorney, Agent, or Firm* — Compass IP Law PC

(57) ABSTRACT

Apparatuses and systems enable power transfer from one or more energy sources to one or more loads. The input power from the energy sources may be unregulated, and the output power to the loads is managed. The power transfer is based on a dynamic implementation of Jacobi's Law (also known as the Maximum Power Theorem). In some embodiments, the energy sources are selectively coupled and decoupled from the power transfer circuitry. In some embodiments, the loads are selectively coupled and decoupled from the power transfer circuitry. Power transfer to the loads is dynamically controlled.

13 Claims, 26 Drawing Sheets

Related U.S. Application Data continuation-in-part of application No. 11/774,562, filed on Jul. 7, 2007, now Pat. No. 7,839,025.

(52) U.S. Cl.
CPC .............. *H02M 7/44* (2013.01); *H02J 3/381* (2013.01); *Y02E 10/58* (2013.01); *Y02E 10/763* (2013.01)

(56) References Cited

U.S. PATENT DOCUMENTS

| | | | |
|---|---|---|---|
| 4,341,607 A | 7/1982 | Tison | |
| 4,375,662 A | 3/1983 | Baker | |
| 4,468,569 A | 8/1984 | Norris | |
| 4,580,090 A | 4/1986 | Bailey et al. | |
| 4,695,785 A | 9/1987 | Mieth et al. | |
| 4,847,546 A | 7/1989 | Bobier et al. | |
| 4,873,480 A | 10/1989 | Lafferty | |
| 4,908,856 A | 3/1990 | Poletto | |
| 5,027,051 A | 6/1991 | Lafferty | |
| 5,270,636 A | 12/1993 | Lafferty | |
| 5,493,204 A | 2/1996 | Caldwell | |
| 5,604,430 A | 2/1997 | Decker et al. | |
| 5,623,398 A | 4/1997 | Beach et al. | |
| 5,659,465 A | 8/1997 | Flack et al. | |
| 5,682,305 A | 10/1997 | Kurokami et al. | |
| 5,684,385 A | 11/1997 | Guyonneau et al. | |
| 5,703,468 A | 12/1997 | Petrillo | |
| 5,801,519 A | 9/1998 | Midya et al. | |
| 5,869,956 A | 2/1999 | Nagao et al. | |
| 5,923,100 A | 7/1999 | Lukens et al. | |
| 6,031,736 A | 2/2000 | Takehara et al. | |
| 6,046,919 A | 4/2000 | Madenokouji et al. | |
| 6,057,665 A | 5/2000 | Herniter et al. | |
| 6,081,104 A | 6/2000 | Kern | |
| 6,100,665 A | 8/2000 | Alderman | |
| 6,100,675 A | 8/2000 | Sudo | |
| 6,111,767 A | 8/2000 | Handleman | |
| 6,294,900 B1 | 9/2001 | Greenwood et al. | |
| 6,433,522 B1 | 8/2002 | Siri | |
| 6,476,315 B2 | 11/2002 | Ganz | |
| 6,547,351 B1 | 4/2003 | Wilson | |
| 6,590,793 B1 | 7/2003 | Nagao et al. | |
| 6,657,419 B2 | 12/2003 | Renyolds | |
| 6,690,590 B2 | 2/2004 | Stamenic et al. | |
| 6,803,824 B2 | 10/2004 | Rategh et al. | |
| 6,844,739 B2 | 1/2005 | Kasai et al. | |
| 6,963,147 B2 | 11/2005 | Kurokami et al. | |
| 6,966,184 B2 | 11/2005 | Toyomura et al. | |
| 6,980,783 B2 | 12/2005 | Liu et al. | |
| 7,030,597 B2 | 4/2006 | Bruno et al. | |
| 7,045,991 B2 | 5/2006 | Nakamura et al. | |
| 7,068,065 B1 | 6/2006 | Nasrullah | |
| 7,091,707 B2 | 8/2006 | Cutler | |
| 7,158,395 B2 | 1/2007 | Deng et al. | |
| 7,239,628 B1 | 7/2007 | Pendleton et al. | |
| 7,256,566 B2 | 8/2007 | Bhavaraju et al. | |
| 7,324,361 B2 | 1/2008 | Siri | |
| 7,408,268 B1 | 8/2008 | Nocentini et al. | |
| 7,456,620 B2 | 11/2008 | Maksimovic et al. | |
| 7,479,774 B2 | 1/2009 | Wai et al. | |
| 7,529,107 B2 | 5/2009 | Mehta | |
| 7,570,501 B2 | 8/2009 | Kawasaki et al. | |
| 7,768,155 B2 | 8/2010 | Fornage | |
| 7,830,680 B2 | 11/2010 | Eguchi et al. | |
| 7,868,482 B2 | 1/2011 | Greene et al. | |
| 8,013,583 B2 | 9/2011 | Matan | |
| 8,473,250 B2 | 6/2013 | Adest et al. | |
| 2002/0163323 A1 | 11/2002 | Kasai et al. | |
| 2003/0066555 A1 | 4/2003 | Hui et al. | |
| 2003/0094931 A1 | 5/2003 | Renyolds | |
| 2004/0081473 A1 | 4/2004 | Sherazi et al. | |
| 2004/0145357 A1 | 7/2004 | Lynch et al. | |
| 2004/0174072 A1 | 9/2004 | Bourilkov et al. | |
| 2004/0257842 A1 | 12/2004 | Hui et al. | |
| 2005/0045223 A1 | 3/2005 | Jenson et al. | |
| 2005/0047175 A1 | 3/2005 | Kawasaki et al. | |
| 2005/0052165 A1 | 3/2005 | Willner et al. | |
| 2005/0057214 A1 | 3/2005 | Matan | |
| 2005/0057215 A1 | 3/2005 | Matan | |
| 2005/0073783 A1 | 4/2005 | Luo et al. | |
| 2005/0076551 A1 | 4/2005 | Silverstone et al. | |
| 2005/0116671 A1 | 6/2005 | Minami et al. | |
| 2005/0172995 A1 | 8/2005 | Rohrig et al. | |
| 2005/0219872 A1 | 10/2005 | Lys | |
| 2005/0231133 A1 | 10/2005 | Lys | |
| 2006/0001406 A1 | 1/2006 | Matan | |
| 2006/0087800 A1 | 4/2006 | Savage | |
| 2006/0164065 A1 | 7/2006 | Hoouk et al. | |
| 2006/0174939 A1 | 8/2006 | Matan | |
| 2006/0185727 A1 | 8/2006 | Matan | |
| 2007/0221267 A1 | 9/2007 | Fornage | |
| 2007/0235071 A1 | 10/2007 | Work et al. | |
| 2007/0273351 A1 | 11/2007 | Matan | |
| 2007/0290651 A1 | 12/2007 | Mcnulty et al. | |
| 2008/0036440 A1 | 2/2008 | Garmer | |
| 2008/0094017 A1 | 4/2008 | Luerkens et al. | |
| 2008/0180075 A1 | 7/2008 | Xie et al. | |
| 2008/0198638 A1 | 8/2008 | Reinberger et al. | |
| 2008/0294916 A1 | 11/2008 | Moussaoui | |
| 2009/0085546 A1 | 4/2009 | Phadke et al. | |
| 2009/0108674 A1 | 4/2009 | Ozaki et al. | |
| 2009/0174262 A1 | 7/2009 | Martin et al. | |
| 2009/0189579 A1 | 7/2009 | Melanson et al. | |
| 2009/0196075 A1 | 8/2009 | Arduini | |
| 2009/0200985 A1 | 8/2009 | Zane et al. | |
| 2009/0244937 A1 | 10/2009 | Liu | |

FOREIGN PATENT DOCUMENTS

| | | |
|---|---|---|
| EP | 1239576 A2 | 9/2002 |
| EP | 0947904 B1 | 10/2003 |
| JP | 8308144 A | 11/1996 |
| JP | 2002139527 A | 5/2002 |
| WO | 9907061 A2 | 2/1999 |
| WO | 03007463 A2 | 1/2003 |
| WO | 03105327 A2 | 12/2003 |
| WO | 2003056680 A3 | 3/2004 |
| WO | 2004030194 A1 | 4/2004 |
| WO | 2004045044 A1 | 5/2004 |
| WO | 2005027300 A1 | 3/2005 |
| WO | 2006075371 A1 | 7/2006 |
| WO | 2006137948 A2 | 12/2006 |
| WO | 2009102842 A2 | 8/2009 |

OTHER PUBLICATIONS

English Translation of Japanese Office Action, Patent Application No. 2009-549097, dated Nov. 12, 2012, 2 pages.

English Translation of Notice of Allowance for Vietnamese Patent Application No. 1-2009-01877, dated May 29, 2017, 3 pages.

English Translation of Office Action for Vietnamese Patent Application No. 1-2009-01877, dated Apr. 16, 2010, 16 pages.

English Translation of Office Action for Vietnamese Patent Application No. 1-2009-01877, dated Oct. 14, 2011, 2 pages.

English Translation of State Intellectual Property Office, P.R. China, Office Action, Patent Application No. 200880010485.5, 17 pages.

English Translation of State Intellectual Property Office, P.R. China, Office Action, Patent Application No. 200880010485.5, 10 pages.

English Translation of State Intellectual Property Office, P.R. China, Office Action, Patent Application No. 200880010485.5, 7 pages.

English Translation of State Intellectual Property Office, P.R. China, Office Action, Patent Application No. 200880010485.5, 5 pages.

Final Office Action for U.S. Appl. No. 11/849,242, dated Jul. 10, 2015, 14 pages.

Final Office Action for U.S. Appl. No. 11/849,242, dated Oct. 28, 2014, 23 pages.

International Search Report for PCT Patent Application No. PCT/US2008/001592, dated Oct. 2, 2008, 5 pages.

Notice of Allowance for U.S. Appl. No. 11/849,242, dated Nov. 6, 2015, 8 pages.

(56) References Cited

OTHER PUBLICATIONS

Office Action for Australian Patent Application No. 2008214329, dated Mar. 1, 2011, 2 pages.
Office Action for Australian Patent Application No. 2011253703 dated Aug. 29, 2013, 3 pages.
Office Action for European Patent Office Patent Application No. 08725249.0-1242, dated Oct. 8, 2012, 4 pages.
Office Action for Government of India Patent Application No. 5196/CHENP/2009, dated Sep. 25, 2015, 2 pages.
Office Action for Mexican Patent Application No. MX/a/2009/008381, dated Jul. 1, 2011, 7 pages.
Office Action for U.S. Appl. No. 11/849,242, dated Jul. 11, 2014, 21 pages.
Office Action for U.S. Appl. No. 11/849,242, dated Mar. 31, 2015, 21 pages.
Office Action for U.S. Appl. No. 11/849,242, dated Oct. 21, 2009, 16 pages.
Written Opinion for PCT Patent Application No. PCT/US2008/001592, dated Aug. 6, 2009, 12 pages.
Brazilian and English Translation of Brazil Office Action for Patent Application No. PI0807015-6, dated Apr. 19, 2018, 13 pages.
Canada Examination Report for Patent Application No. 2680561, dated Dec. 6, 2017, 3 pages.
English Translation of State Intellectual Property Office, P.R. China, Office Action, Patent Application No. 200880010485.5, dated Jan. 23, 2013, 5 pages.
Examination Report with Notice of Grant Fees due from application No. 200905219-2 dated Nov. 12, 2010, 3 pages.
Final Office Action for U.S. Appl. No. 11/774,563, dated May 11, 2011, 12 pages.
Final Office Action for U.S. Appl. No. 11/774,563, dated May 26, 2010, 16 pages.
Final Office Action for U.S. Appl. No. 11/774,565, dated May 26, 2010, 13 pages.
Final Office Action for U.S. Appl. No. 11/774,566, dated Apr. 21, 2010, 17 Pages.
Final Office Action for U.S. Appl. No. 11/774,566, dated Aug. 7, 2014, 13 Pages.
Final Office Action for U.S. Appl. No. 11/774,566, dated May 23, 2011, 13 Pages.
Final Office Action for U.S. Appl. No. 11/849,242, dated Oct. 25, 2010, 12 pages.
Final Office Action dated Oct. 28, 2009 for U.S. Appl. No. 11/774,562.
International Preliminary Report on Patentability (Chapter I) dated Aug. 20, 2009 for International Application No. PCT/US2008/001592.
Non-Final Office Action for U.S. Appl. No. 11/774,562, dated May 25, 2010, 14 pages.
Non-Final Office Action for U.S. Appl. No. 11/774,564, dated Apr. 28, 2010, 24 Pages.
Non-Final Office Action dated Jul. 2, 2009 for U.S. Appl. No. 11/774,562.
Non-Final Office Action dated Jul. 7, 2009 for U.S. Appl. No. 11/774,563.
Non-Final Office Action dated Nov. 3, 2011, for U.S. Appl. No. 11/774,563, 10 pages.
Non-Final Office Action dated Oct. 10, 2009 for U.S. Appl. No. 11/774,565.
Non-Final Office Action dated Sep. 17, 2009 for U.S. Appl. No. 11/774,564.
Non-Final Office Action dated Sep. 4, 2009 for U.S. Appl. No. 11/774,566.
Office Action for European Patent Office Patent Application No. 08725249.0, dated Feb. 17, 2016, 4 pages.
Office Action for European Patent Office Patent Application No. 08725249.0, dated Jul. 26, 2017, 4 pages.
Office Action for European Patent Office Patent Application No. 08725249.0, dated Oct. 19, 2016, 4 pages.
Office Action for U.S. Appl. No. 11/849,242, dated May 26, 2010, 11 pages.
Office Action from U.S. Appl. No. 11/774,563 dated Oct. 25, 2010, 12 pages.
Office Action from U.S. Appl. No. 11/774,564 dated Oct. 14, 2010, 26 pages.
Office Action from U.S. Appl. No. 11/774,565 dated Oct. 15, 2010, 13 pages.
Office Action from U.S. Appl. No. 11/774,566 dated Nov. 1, 2010 15 pages.

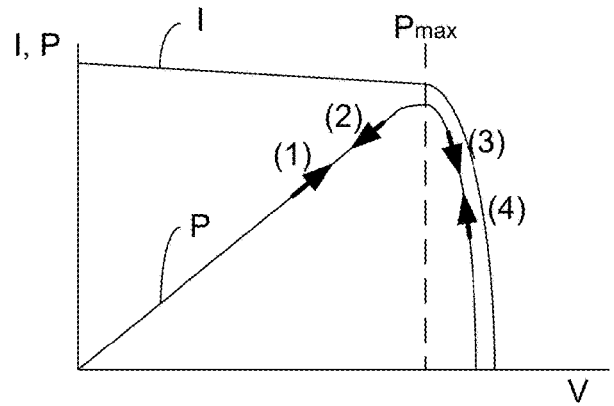
FIG. 9
| Example | Power | Voltage | Side of Pmax | Current | Change to Duty Cycle |
|---|---|---|---|---|---|
| (1) | Increasing | Increasing | Left | Too much | Decrease |
| (2) | Decreasing | Decreasing | Left | Too much | Decrease |
| (3) | Decreasing | Increasing | Right | Too little | Increase |
| (4) | Increasing | Decreasing | Right | Too little | Increase |
FIG. 10
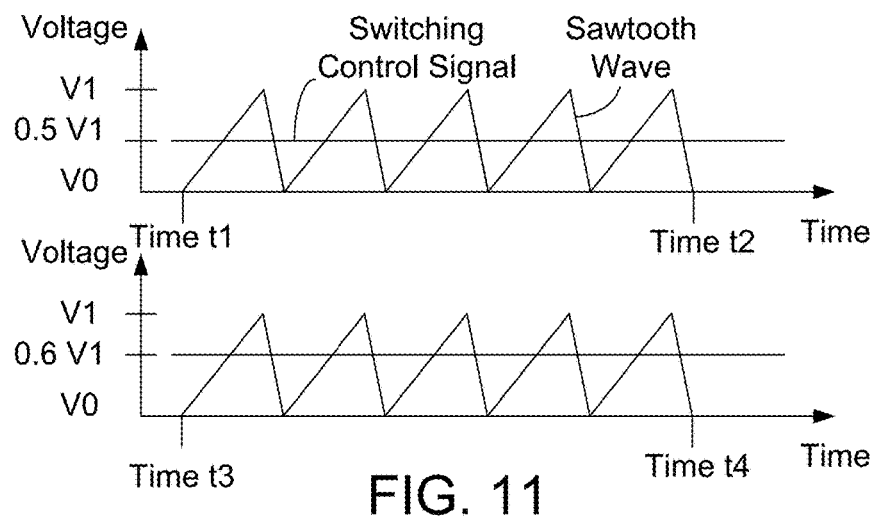
FIG. 11

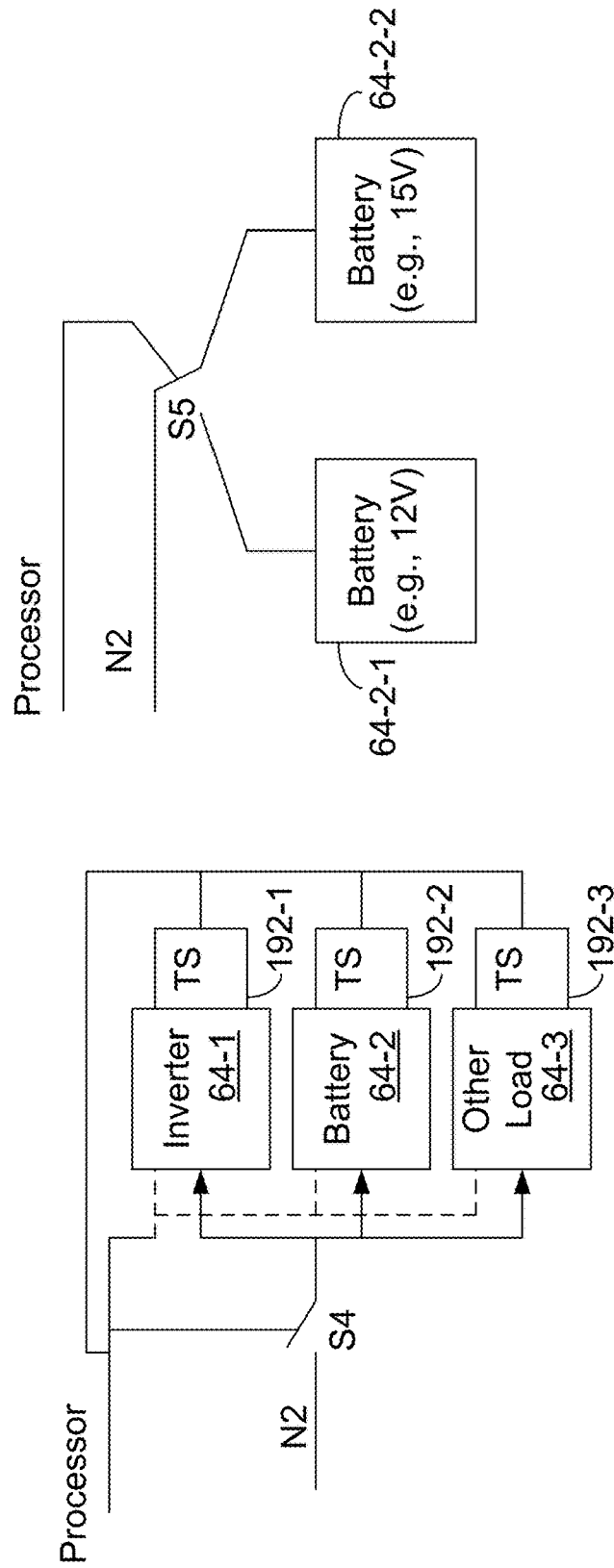

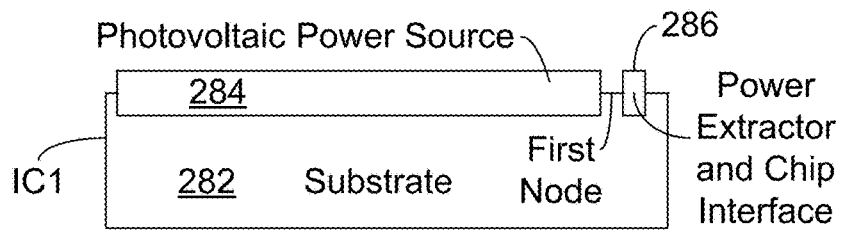
FIG. 32
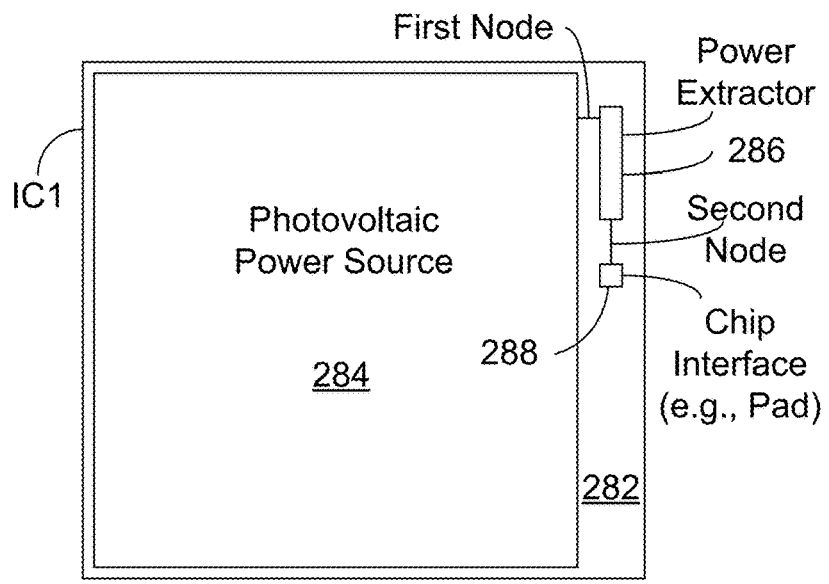
FIG. 33
| IC1 | IC2 | IC3 | IC4 | IC5 |
|-----|-----|-----|-----|-----|
| IC6 | IC7 | IC8 | IC9 | IC10 |
| IC11 | IC12 | IC13 | IC14 | IC15 |
| IC16 | IC17 | IC18 | IC19 | IC20 |
| IC21 | IC22 | IC23 | IC24 | IC25 |
FIG. 34

MULTI-SOURCE, MULTI-LOAD SYSTEMS WITH A POWER EXTRACTOR

RELATED APPLICATIONS

This application is a Divisional of U.S. patent application Ser. No. 11/849,242, filed Aug. 31, 2007, and entitled, "Multi-Source, Multi-Load Systems with a Power Extractor," and claims the benefit of priority of that application.

U.S. patent application Ser. No. 11/849,242 in turn is a Continuation-in-Part of U.S. patent application Ser. No. 11/774,562, filed Jul. 7, 2007, and entitled, "Power Extractor Detecting a Power Change," and claims the benefit of priority of that application. This application also claims the benefit of priority of U.S. Provisional patent applications 60/867,342, filed Nov. 27, 2006, and entitled, "XSLENT Power Extraction Technology—XPX," and 60/888,486, filed Feb. 6, 2007, and entitled, "XPX Power Converter."

FIELD

Embodiments of the invention relate to electrical power, and more particularly to power transfer from one or multiple sources to one or multiple loads with a power extractor.

BACKGROUND

Traditional power transfer between a source and load involves static system configurations. The source and the load configurations are traditionally known prior to system design. System design is performed to attempt to maximize power transfer between the source and load. Traditional systems typically regulate the output by virtue of their static design principles, which results in consistent, regulated power transfer. Without proper design, traditional power transfer circuits are not well suited for many system applications.

SUMMARY

Apparatuses and systems enable dynamic power transfer from one or more power sources to one or more loads. The power sources and/or loads can be selectively, dynamically coupled and decoupled, and the power transfer between the sources and loads is dynamically controlled. In some embodiments, the power transfer is managed in part based on a power profile of a load to which power is transferred. In some embodiments, a power extractor dynamically matches impedance of the energy source on the input power and/or the impedance of the load on the output power. In some embodiments, operational status of the power extractor is displayed. In some embodiments, the power extractor communicates with another entity to exchange status and/or configuration information.

In some embodiments, power transfer is source to line where the source is direct and the line characteristics are either direct or alternating. In embodiments where the line to source is direct we refer to this as DC to DC. In embodiments where the line to source is direct to alternating we refer to this as DC to AC. The output frequency of the alternating current can be based on a frequency requirement of the load. The output frequency can also or alternatively be set by a configuration parameter, such as a software control parameter or a switch configuration. In some embodiments, the output current is provided at a voltage based on a voltage requirement of the load. The output voltage can also or alternatively be set by a configuration parameter, such as a software control parameter or a switch configuration. The output current at the output voltage can be provided at one or more phases, according to a requirement of the load. The phases can also or alternatively be set by a configuration parameter, such as a software control parameter or a switch configuration.

In some embodiments, the power sources are detected and dynamically coupled or decoupled. Similarly, loads can be detected and dynamically coupled or decoupled. The coupling and decoupling can manage the input and output power for the system. The coupling and decoupling may be based on operating conditions of the system. In some embodiments, loads are assigned a priority, and the power transfer management transfers power to the loads based on priority. For example, functional circuits of a system (e.g., those that convert power into useful work) may have higher priority than a battery that is charged by the system via a trickle charge.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 9 illustrates power change examples in connection with a current-voltage (IV) curve and a power curve.

FIG. 10 is a table illustrating operational concepts for a power extractor according to various embodiments.

FIG. 11 illustrates two examples of a saw tooth wave and a switching control signal according to some embodiments.

FIG. 26 illustrates processor control in connection with a load according to some embodiments.

FIG. 27 illustrates two different battery loads connected to an output node by a switch according to some embodiments.

FIG. 32 illustrates a side view of a integrated circuit including a photovoltaic power source and a power extractor according to some embodiments.

FIG. 33 illustrates a top view of the integrated circuit of FIG. 32.

FIG. 34 illustrates a group of the integrated circuits of FIG. 32 in an array.

FIGS. 35-37 each illustrate a group of PV cells or panels with corresponding power extractors according to some embodiments.

Figure 1:
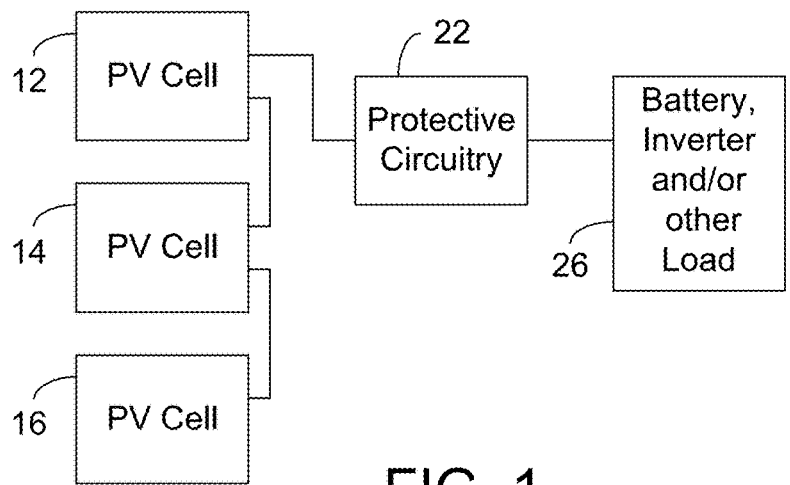
FIG. 1 illustrates a prior art system for charging a battery or providing power to another load using solar power.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

The following describes a power extractor for providing DC to DC or DC to AC power from one or more power sources to one or more loads. The power extractor is called a power "extractor" because it operates in a way to obtain more power from a power source than typically would be obtained by the source without the operation. In examples provided in this disclosure, the power extractor operates to obtain impedance matching between the power source and the combination of the power extractor and the load, and between the load and the combination of the power source and the power extractor. This is called universal impedance matching because it occurs both as seen from the power source and as seen from the load. This impedance matching allows the power source to provide a greater amount of power than it would without the impedance matching. In some embodiments, discussed below, the power extractor is a power extraction switching converter.

As described herein, the power extractor can be provided in any of a number of dynamically-adjusting applications. The systems can have one or more power sources, which may come on and offline, and one or more loads that likewise can come on and offline. Rather than having static configurations for transferring power, the power transferring can be applied dynamically and intelligently by the power extractor.

In some embodiments, the impedance matching occurs as a consequence of the power extractor seeking a maximum power. In some embodiments, the power extractor causes impedance matching by changing the duty cycle of switching circuitry coupled to power transfer circuitry of the power extractor to cause increases in power until a maximum power is achieved. The changes to the duty cycle are made in response to detected power changes. In some embodiments, the power change is detected continuously through analog circuitry, while in other embodiments the power change is detected continuously through digital circuitry. In some embodiments, the detected power change includes a power slope, such as an instantaneous power slope. When the detected power change is zero at a true power maximum (not merely a local zero change), the power transferred is at a magnitude (level or amount) that the power source provides a maximum power given conditions beyond the control of the power extractor. In some embodiments, maximum available power is typically very closely approached. Actually achieving maximum available power is an example very closely approaching it. Examples of such conditions beyond the control of the power extractor that may apply for some power sources include environmental conditions (e.g., amount of sun light, temperature) and size of the power source (e.g., larger photovoltaic cells or larger number of cells may provide more power). If the power extractor's impedance is such that power is extracted at power at too high of a current or too high of a voltage or too low of a current or too low of a voltage, the power source will provide less than a maximum amount of power. The maximum amount of power will be obtained at a particular impedance. See FIGS. 9 and 10 and related discussion.

As used herein, a DC power source (called a power source herein), includes any source from which DC power might be generated and/or captured. Examples of DC power sources that may be used in accordance with embodiments of the invention include, but are not limited to, photovoltaic cells or panels, a battery or batteries, and sources that derive power through wind, water (e.g., hydro-electric), tidal forces, heat (e.g., thermal couple), hydrogen power generation, gas power generation, radioactive, mechanical deformation, piezo-electric, and motion (e.g., human motion such as walking, running, etc.). Power sources may include natural energy sources and man-made power sources, and may be stable (providing an essentially constant power but variable in magnitude) and unstable (providing power that varies over time). In some embodiments, the power sources include sub-power sources (e.g., a solar panel may multiple cells), while in other embodiments, the power source is unitary. A disadvantage of using sub-power sources is that they might have different impedances and a single power extractor may match with the combined impedance, which may be less optimal than having a separate power extractor for each power source. A "power source" may also be considered an "energy source."

Figure 2:
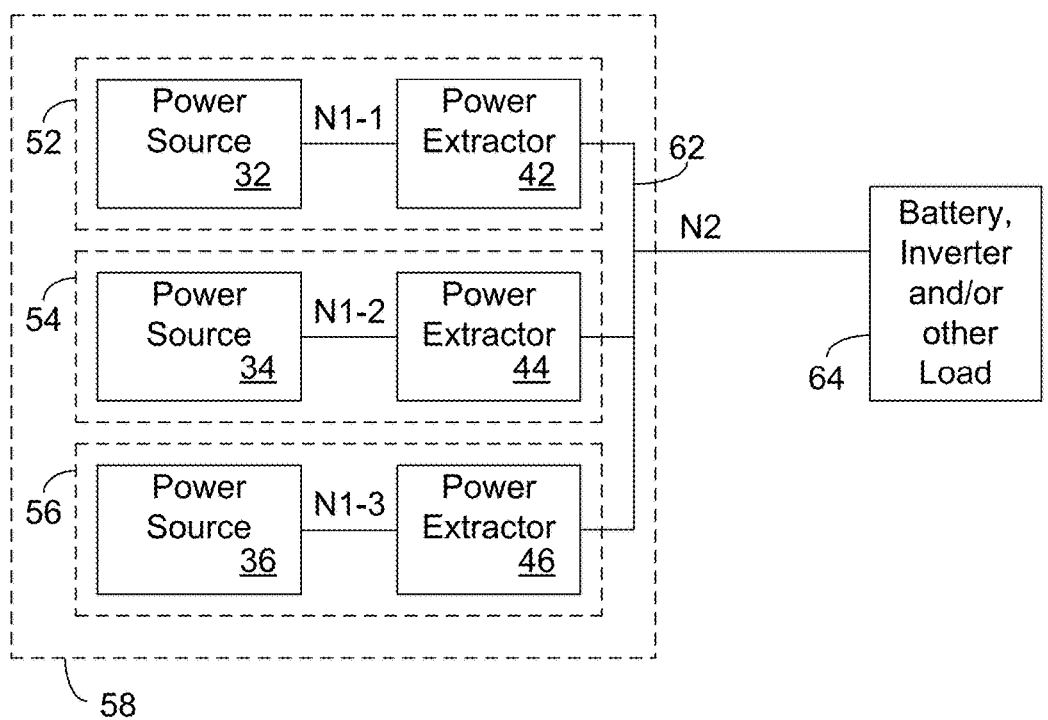
FIG. 2 illustrates an array of power sources and power extractors to provide power to a load according to some embodiments of the inventions.

FIG. 2 illustrates a system including power sources 32, 34, and 36 coupled to power extractors 42, 44, and 46, respectively. Power source 32 and power extractor 42 form a power unit 52 and may be physically separated as shown in FIG. 2 and adjacent as shown in other figures. Likewise, power sources 34 and 36 form power units 54 and 56. The output of power extractors 42, 44, and 46 are joined at a node N2 and cumulatively provide power to node N2. Load 64 is also joined to node N2. Load 64 may include a single load or sub-loads such as a battery (or batteries), an inverter and/or another sub-load or other load. Nodes N1-1, N1-2, and N1-3 are between power sources 32, 34, and 36 and power extractors 42, 44, and 46. Power units 52, 54, and 56 form a power assembly 58. A power assembly may include more than three power units or merely two power units. A load line 62 is illustrated. Unidirectional protection devices (e.g., diodes) may be used to prevent backflow of current to the power sources, but they are not required.

Figure 3:
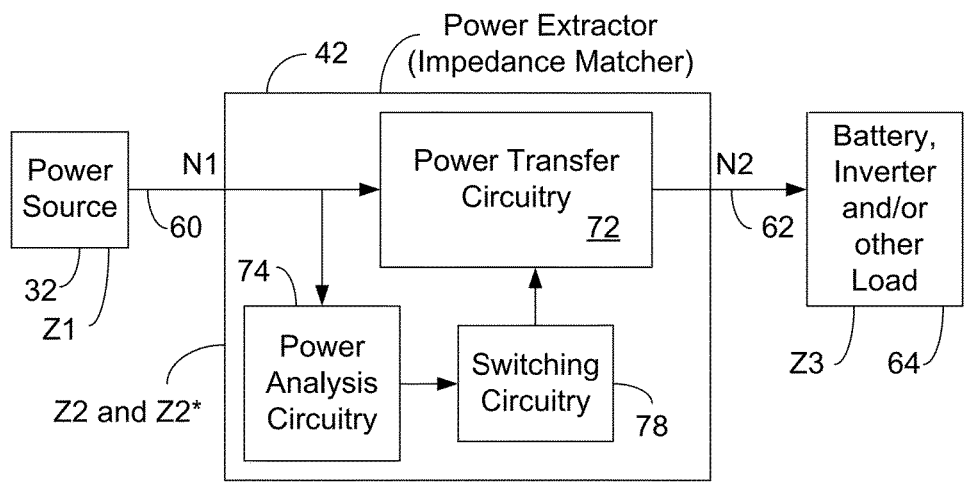
FIG. 3 illustrates a system including a power source, power extractor, and load configured according to some embodiments of the inventions.

FIG. 3 illustrates a system with a power source 32 having an output impedance Z1 coupled through a conductor 60 and node N1 to power extractor 42. Power extractor 42 is referred to as an impedance matcher, because as discussed above, in at least one mode of operation, it matches impedances as discussed. In some embodiments, power extractor 42 may operate in different modes. For example, in an ordinary operating mode (called a first mode herein), power extractor 42 operates to impedance match so that a maximum available power is provided by the power source. When it is said that power extractor 42 "operates to impedance match so that a maximum available power is provided" it is understood that, in practice, perfect impedance matching is typically not obtained and an absolute maximum available power is typically not obtained from the power source. Nevertheless, power extractor 42 operates so as to seek perfect impedance matching or to approach perfect impedance matching under closed-loop control including power analysis circuitry 74 and described below. In some embodiments, under steady state conditions, perfect impedance matching may be very closely approached.

Likewise, when it is said that the power transfer circuitry is to transfer the power at a magnitude to cause a power source to provide a maximum power available given conditions beyond the control of the power extractor, it is understand the power source approaches the maximum power under the closed-loop control of the power extractor. In some embodiments, that maximum available power is approached very closely. The power extractor may be said to seek to operate in a way to cause the power source to provide a maximum available power. Approaching perfect impedance matching or maximum power does not mean constantly moving closer and closer to perfect matching or maximum power. Sometimes, changes in the input impedance cause the impedance matching to be closer to perfect (or optimal) impedance matching and sometimes changes in the input impedance (or changes in the power source impedance) cause the impedance to be further from perfect matching, but overall the control loop causes a significant improvement in impedance matching compared to what it would be without the control loop. Likewise, with approaching maximum power.

In a protection mode (called a second mode herein), power extractor 42 operates to protect itself and/or load 64 and/or source 32. The protective mode may be entered into in response to a limiting condition. Examples of limiting conditions are excessive voltage, power, or current in the first node, power extractor, or second node; too little voltage, power, or current in the first node, power extractor, or second node; and a device limiting condition. In some embodiments, power extractor 42 detects only some of these limiting conductions to determine whether to enter a protection mode. There may be additional modes and there may be more than one type of ordinary operating mode and more than one type of protection mode. For example, in at least one mode, power source conservation may be more important that achieve maximum power. This may be the case, for example, if the power source is a battery (see the example of FIG. 41).

Power extractor 42 includes power transfer circuitry 72 of FIG. 3 between nodes N1 and N2 and provides output power to a load 64 through a node N2 and load line 62. For convenience of illustration, power extractor 42 is shown as partially overlapping nodes N1 and N2. However, nodes N1 and N2 may be considered as being at the boundary of power extractor 42, but note discussion of FIGS. 8 and 15. Load 64 has an input impedance Z3. Power extractor 42 includes power analysis circuitry 74 that analyzes the power and provides a switching circuitry control signal to control switching circuitry 78. Switching circuitry 78 operates to at least partially control the operation of power transfer circuitry 72. Power extractor 42 includes an input impedance of Z2 and an output impedance of Z2*. When changes in power are detected, power analysis circuitry 74 responds by adjusting the timing (e.g., duty cycle) of switching circuitry 78. Switching circuitry 78 may also react in a manner that seeks to maximize energy transfer efficiency through, for example, changing a frequency of switching of switching circuitry 78.

Figure 4:
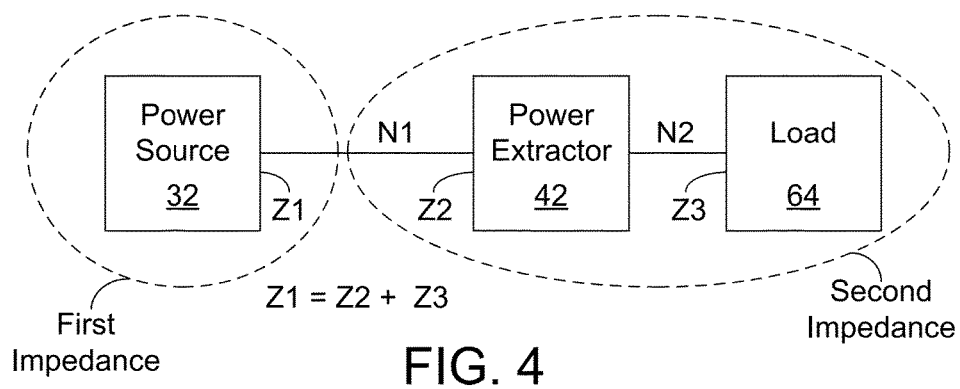
FIG. 4 illustrates impedance matching characteristics of a power extractor as viewed from a power source according to various embodiments of the inventions.
Figure 5:
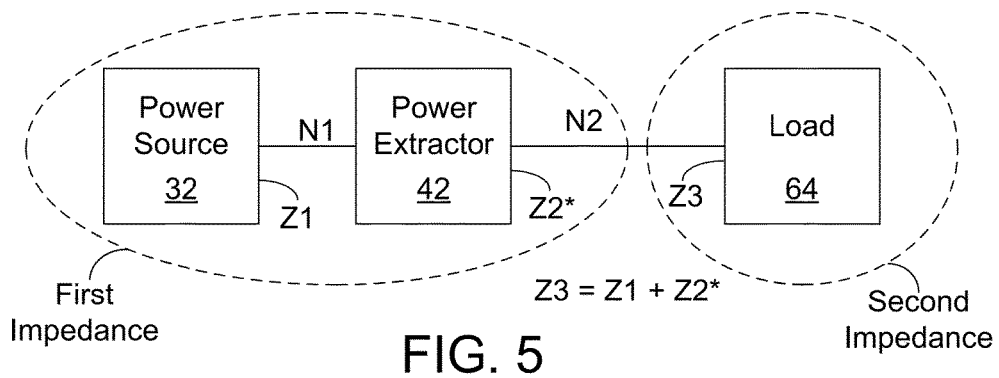
FIG. 5 illustrates the impedance matching characteristics of a power extractor as viewed from a load according to various embodiments of the inventions.

FIGS. 4 and 5 illustrate the impedance matching characteristics of power extractor 42 of FIG. 3. In FIG. 4, power source 32 has impedance Z1, called a first impedance in FIG. 4. Power extractor 42 has input impedance Z2 while load 64 has the impedance Z3. In FIG. 4, the combination of Z2 and Z3 is called a second impedance. The impedance as seen by power source 32 when looking at the power extractor 42 is equal to its own impedance. In other words, power extractor 42 dynamically matches the impedance of power source 32 (i.e., Z1=Z2+Z3) so that the first and second impedances equal each other.

FIG. 5 illustrates that the impedance as seen by load 64 when looking at power extractor 42 is also equal to its own impedance. In FIG. 5, the first impedance is Z1 and Z2* (the output impedance of power extractor 42) and the second impedance is Z3. Load 64 sees output impedance Z2* on power extractor 42. Thus, power extractor 42 also dynamically matches the impedance of the load (i.e., Z3=Z1+Z2*) so that the first and second impedances are matched. Given that the impedance of power extractor 42 is typically different (Z2 or Z2*) depending whether the impedance is measured at N1 or N2, the impedances (Z2+Z3) as seen by the power source and (Z1+Z2*) as seen by the load may be thought of as virtual impedances.

In some embodiments, whether power extractor 42 seeks to impedance match with power source 32 depends on whether load 64 can receive all the power that power source 32 can provide. If load 64 can receive more than source 32 can provide, then power extractor 42 seeks to have its input impedance match with the output impedance of power source 32, but does not necessarily seek to have its output impedance match with the input impedance of load 64. If load 64 can receive less than power source 32 can provide, then power extractor 42 may go into a mode (possibly a protection mode) in which it does not seek to have its input impedance match with the output impedance of power source 32, but may seek to match its output impedance with the input impedance of load 64. If load 64 can receive exactly or essentially exactly what source 32 can provide, then power extractor 42 may seek to have its input impedance match with the output impedance of power source 32 and its output impedance match with the input impedance of load 64. In other embodiments, power extractor 42 may operate different. Impedance matching at the output node (node N2 in FIG. 3) may occur when power extractors are connected together.

Figure 6:
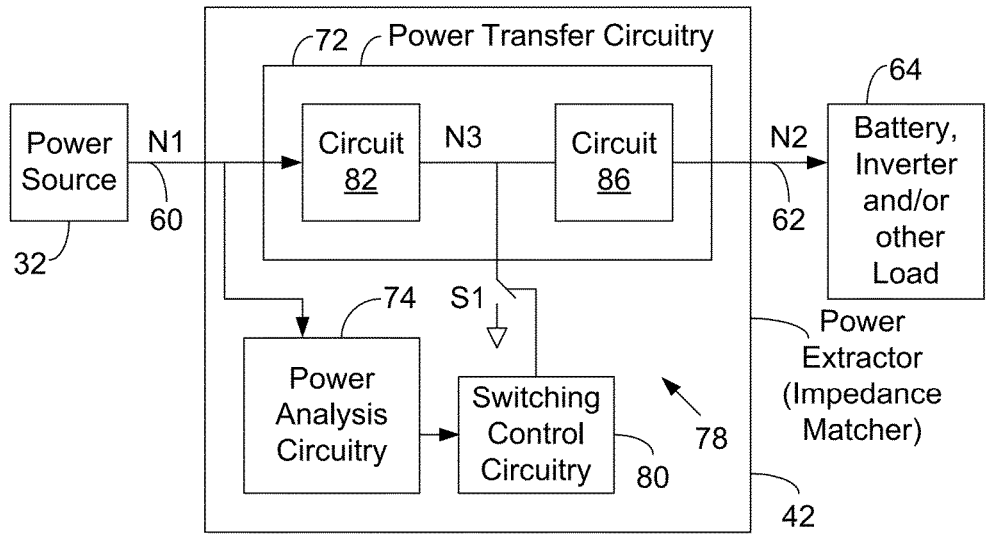
FIGS. 6 and 7 each illustrate a system including a power source, power extractor, and load according to some embodiments of the inventions.

FIG. 6 illustrates a circuit 82 and a circuit 86 separated by a node N3 in power transfer circuitry 72. Impedances of circuits 82 and 86 may be coadjutive (rendering mutual aid) and are modulated so that the aggregate impedance of power extractor 42 and load 64 is matched to the output impedance of power source 32. In some embodiments and situations, the aggregate impedance of power source 32 and power extractor 42 is matched to the input impedance of load 64. Power is continuously transferred from power source 32 through circuit 82. The duty cycle of S1 is dynamically adjusted to facilitate the virtual impedance matching to the power source 32. Once the impedances are matched, the power extracted from power source 32 is maximized. Likewise, power is continuously transferred from circuit 86 to load 64. The amount of power driven into load 64 is maximized when the impedance of circuit 86 is matched with the impedance of load 64. A control loop 70 includes power analysis circuitry 74 and switching control circuitry 80. In some embodiments, control loop 70 is partly implemented with software. Switch S1 is controlled by switching control circuitry 80. Power change analysis circuitry 74 detects changes in power from power source 32 at node N1 and communicates with switching control circuitry 80. Switching control circuitry 80 controls, for example, the duty cycle of S1 so as to increase power as described below.

Figure 7:
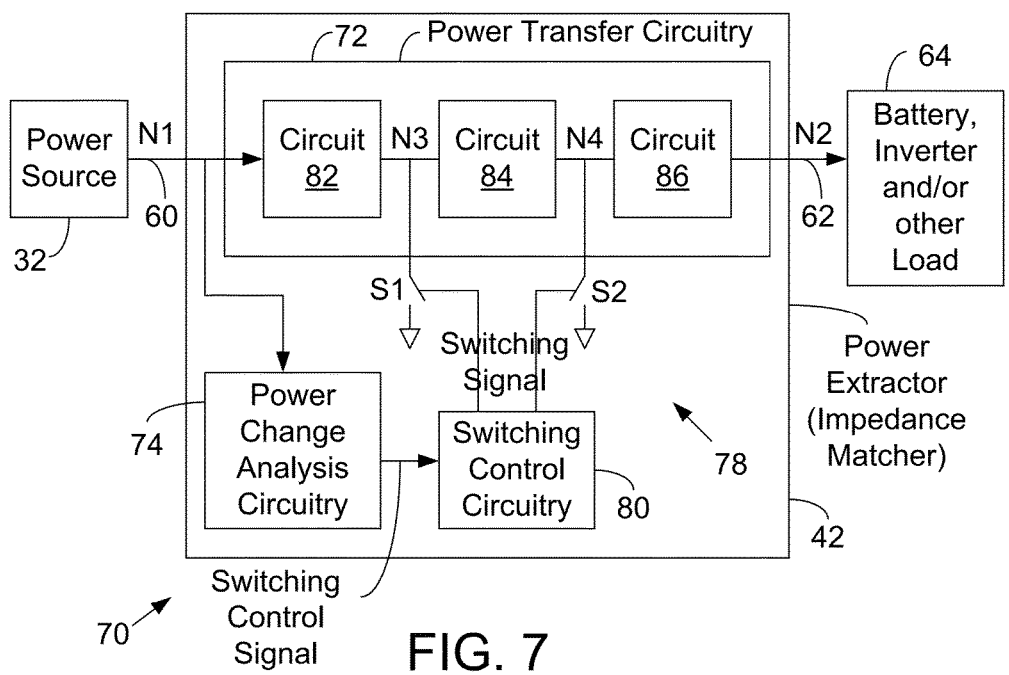

FIG. 7 illustrates another power transfer circuitry configuration that may be used in some embodiments of the invention. In FIG. 7, power transfer circuitry 72 includes a circuit 84 between circuits 82 and 86, with node N3 between circuits 82 and 84 and node N4 between circuits 84 and 86. Switching control circuitry 80 provides a switching signal(s) to control switches S1 and S2. In some embodiments, the duty cycle of the switching signal to S1 is the inverse of the duty cycle of the switching signal to S2. In other embodiments, the switching signals to S1 and S2 are intentionally not inverses of each other. In some embodiments, there may be additional switches. Circuits 82, 84, and 86 may be coadjutive impedances and are modulated by switches S1 and S2 under the control of switching control circuitry 80 such that the aggregate impedance of power extractor 42 and load 64 matches the output impedance of power source 32, and the aggregate impedance of power source 32 and power extractor 42 matches the input impedance of load 64. When the impedance of power source 32 is matched with the combination of power extractor 42 and load 64, circuit 72 is able to extract maximum power from power source 32.

In some embodiments, circuit 84 transfers accumulated voltage potential from N3 to N4 without interrupting the flow of power from circuit 82 to circuit 86. Circuit 86 adapts its output impedance to facilitate impedance matching with load 64. The duty cycle of S2 is dynamically adjusted to cause the impedance matching between circuit 86 and load 64. Thus, circuit 86 is able to transfer maximum power into load 64. While circuit 86 is transferring power to load 64, circuit 82 continues to match its impedance with the impedance of power source 32 allowing maximum power to be transferred from power source 32 through circuit 82. This process continues as S1 and S2 are alternately opened and closed according to the duty cycle of the switching signal. In some embodiments, the switch states of S1 and S2 are controlled by switching control circuitry 80 which receives the switching control signal from power change analysis circuitry 74 based on the changes in power available at N1. Alternatively, the power change detected can be a power change at a place other than node N1 such as node N2 or inside power extractor 42.

Figure 8:
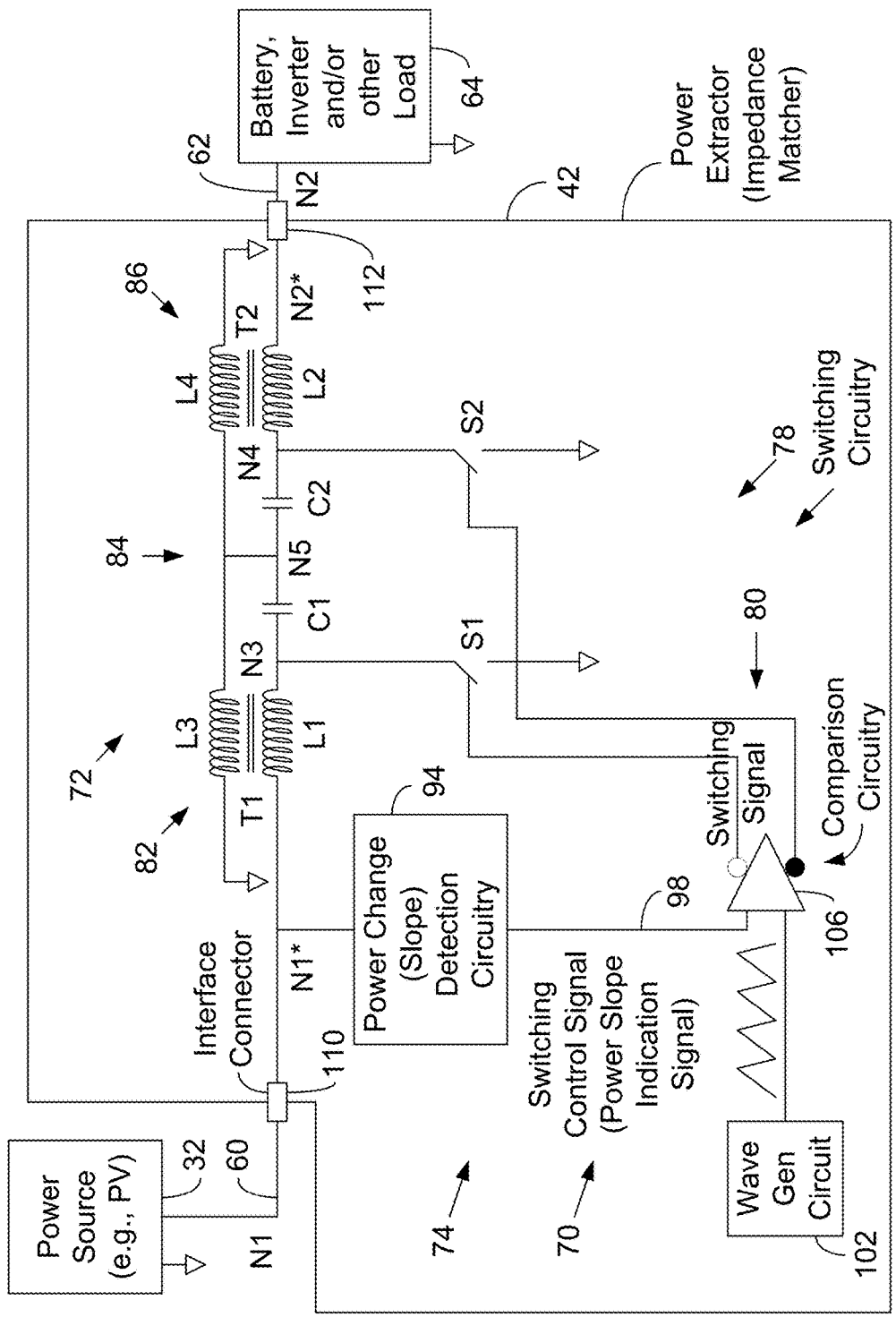
FIG. 8 illustrates details of some embodiments of the system of FIG. 7.

FIG. 8 illustrates details that are included in some embodiments of FIGS. 5 and 7, but other embodiments include different details. Referring to FIG. 8, power change analysis circuitry 74 includes power change detection circuitry 94 and other circuitry shown in other figures. Power transfer circuitry 72 includes circuits 82, 84, and 86. Circuits 82 and 84 include transformer T1 (including inductors L1 and L3) and transformer T2 (including inductors L2 and L4). Circuit 82 includes capacitors C1 and C2 and a node N5 separating C1 and C2 and connected to inductors L3 and L4. Power source is coupled to inductor L1 through conductor 60 of node N1, an interface connector 110, and a node N1*. As an example, connector 110 may be a plug receptacle (see also FIG. 15). If the impedance difference between N1, connector 110, and N1* are relatively small, then they may be considered one node. Otherwise, they may be considered more than one mode. Likewise with node N2*, connector 112, and node N2. Inductor L1 is between nodes N1* and N3, and inductor L2 is between nodes N4 and N2*.

Power change detection circuitry 94 detects a power change of power at node N1* and provides a switching control signal on conductor 98 to one input of comparison circuitry 80. In some embodiments, power change detection circuitry 94 detects a slope of the power change and may be called power slope detection circuitry 94 and provide a power slope indication signal (as shown in FIG. 8). In some embodiments, the power slope is an instantaneous power slope. Another input of comparison circuitry 106 receives a waveform such as a saw tooth wave from waveform generator circuit 102. Comparison circuitry 106 controls a duty cycle of switches S1 and S2. In some embodiments, S1 and S2 are not both open or both closed at the same time (with the possible exception of brief transitions when they are switching). Waveform generator circuit 102 and comparison circuitry 106 are examples of circuitry in switching control circuitry 80.

When S1 is closed, electromagnetic fields change in T1 and T2 while the electrostatic potential across C1 and C2 is altered and energy from power source 32 is distributed electromagnetically into T1 and T2, while electrostatically in C1 and C2. When S1 opens, S2 closes and the magnetic flux in T1 begins to decrease. Thus, the energy stored in T1 flows through N3 to capacitors C1 and C2 of circuit 84, depositing some of the energy as an electrostatic field onto C1 and C2, and some of the energy into T2 of circuit 86 through node N5 and inductor L4. The residual flux in T2 also begins to decrease, transferring energy into the load 64 through N2. When S1 closes and S2 opens again, the magnetic flux in T1 begins to increase while the magnetic flux T2 also increases as it consumes some of the electrostatic energy that was previously stored onto C1 and C2. Thus energy stored in circuit 84 is discharged and transferred to T2 and load 64.

Multi-phase energy transfer combines two or more phased inputs to produce a resultant flux in a magnetic core equivalent to the angular bisector of the inputs. (Note: an angle bisector of an angle is known to be the locus of points equidistant from the two rays (half-lines) forming the angle.) In this embodiment of the power extractor, capacitors C1 and C2 are used to shift the phase of the current that is applied to the secondary winding of T1 and T2 (L3 and L4 respectively). Thus, multi-phased inputs are applied to the cores of T2 and T3. The summation of the multiphase inputs alter the electromotive force that present during the increase and reduction of flux in the transformers primary windings L1 and L3 The result is the neutralization (within the bandwidth of the operational frequency of the power extractor) of high frequency variations in the reactive component of the impedance that circuits 82 and 86 exhibit to the source and load respectively. Circuits 82 and 86 may be multiphase bisector energy transfer circuits to cause the multiphase bisector energy transfer and to interface with circuit 84.

Due to the dynamic properties of circuit 82, power source 32 "sees" an equivalent impedance at inductor L1 power extractor 42. Likewise, with inductor L2 and load 64. The input and output impedances of power extractor 42 are adjusted by controlling the duty cycle of S1 and S2. Optimal matching of impedances to the power source 32 occurs when maximum power extraction from the power source is achieved.

Power slope detection circuitry 94, power change indication signal, and comparison circuitry 106 are part of a control loop that controls the duty cycle of switching circuitry 78 to achieve maximum power extraction (i.e., $\Delta P/\Delta V=0$) from power source 32. The control loop may also control the switching frequency of switching circuitry 78 to influence the efficiency of power transfer through the power transfer circuitry 72. Merely as an example, the frequency may be in the range of 100 KHz to 250 KHz depending on saturation limits of inductors. However, in other embodiments, the frequencies may be substantially different. The size and other aspects of the inductors and associated cores and other components such as capacitors can be chosen to meet various criterion including a desired power transfer ability, efficiency, and available space. In some embodiments, the frequency can be changed by changing the frequency of the waveform from waveform generator circuit 102. Other figures show a control of circuit 102. In some embodiments, the frequency is controlled by a control loop as a function of whether an on-time rise of current is between a minimum and maximum current in a energy transfer circuit.

As used herein, the duty cycle of switching circuitry 78 is the ratio of the on-time of S1 to the total on-time of S1 and S2 (i.e., duty cycle=S1/(S1+S2)). The duty cycle could be defined by a different ratio associated with S1 and/or S2 in other embodiments. When the voltages of power source 32 and load 64 are equal and the duty cycle is 50%, there is zero power transfer through power extractor 42 in some embodiments. If the voltages of power source 32 and load 64 are different, a higher or lower duty cycle may cause zero power transfer through power extractor 42. In other words, a particular duty cycle of switching circuitry 78 is not tied to a particular direction or amount of power transfer through power transfer circuitry 72.

As noted, the power change can be continuously detected and the switching control signal (of FIGS. 7, 8, and 11) can be continuously updated. Using analog circuits is one way to perform continuous detection and updating. Using digital circuits (such as a processor) is another way to perform continuous detection and switching control signal updating. Even though the updating from some digital circuits may in some sense not be exactly continuous, it may be considered continuous when for all practical purposes it produces the same result as truly continuous updating. As an example, the updating of the switching control signal is also considered continuous when the frequency of change is outside the control loop bandwidth. In some cases, the updating of the switching control signal also could be considered continuous when the frequency of change is within the control bandwidth. Merely as an example, in some implementations, the control loop bandwidth may be around 800 Hz. In other embodiments, the control loop bandwidth is higher than 800 Hz, and perhaps much higher than 800 Hz. In still other embodiments, the control loop bandwidth is lower than 800 Hz and depending on the desired implementation and performance may be lower than 400 Hz.

FIG. 9 illustrates an example of a typical current-voltage (I-V) curve and a power curve. Many power sources (e.g., a solar panel) produce a relatively constant current at different voltages. However, when the voltage reaches a certain threshold in these power sources, the current begins to drop quickly. The threshold voltage corresponds to a knee region in the I-V curve. The maximum power point ($P_{max}$) also corresponds to the knee region in the I-V curve.

FIG. 10 is a table illustrating operational concepts for power extractor 42 according to various embodiments. Example (1), shown as arrow (1) on FIG. 9, shows that when power and voltage are both increasing, the operating point of the power extractor is on the left side of $P_{max}$. When operating on the left side of $P_{max}$, too much current is being drawn by power extractor 42 from power source 32 and, accordingly, power source 32 is providing less than a maximum available power from power source 32. The maximum available power is the most amount of power that could be achieved given environmental conditions and other conditions beyond the control of power extractor 42. In order to reduce current flow, the duty cycle of switching control circuitry 78 is decreased. This is also the case with example (2) in which arrow (2) shows that when power and voltage are both decreasing, there is also too much current and less than a maximum available power from power source 32. Conversely, when operating on the right side of $P_{max}$ (examples (3) and (4)), too little current is being drawn by the power extractor and less than a maximum available power from power source 32. Thus, in order to increase the current flow, the duty cycle of switching control circuitry 89 is increased. FIGS. 9 and 10 illustrate a specification implementation under particular conditions. Other implementations may operate differently and involve additional factors. In a different implementation, the current could be increased by decreasing the duty cycle.

Referring again to FIG. 9, if the power is at Pmax for a length of time, then the power and voltage is neither increasing nor decreasing for that length of time. Accordingly, the duty cycle may remain the same. In some embodiments, the control loop includes mechanisms to prevent a local power maximum (local minimum slope) that is not a true maximum power from being interpreted as a power maximum so the duty cycle is not changed. One mechanism is the natural noise that will tend to cause control loop fluctuations resulting in the power change. Another mechanism is artificially induced control loop fluctuations that in some implementations may result in the duty cycle changing after a particular amount of time if the detection circuitry shows no change in power or voltage.

Power slope detection circuitry 94 creates the switching control signal in response to the situation of FIG. 10. FIG. 11 illustrates how comparison circuitry 106 compares the switching control signal with the saw tooth waveform. The duty cycle of switching control circuitry 78 changes as the area of the saw-tooth wave above the switching control signal changes. For example, the area of the saw-tooth wave above the switching control signal is smaller from time t3 to t4 than from time t1 to t2. The smaller area above the switching control signal corresponds to a lower duty cycle. The smaller area above the switching control signal could correspond to a higher duty cycle in other embodiments. The voltages 0.5 V1 and 0.6 V1 are used for purposes of illustration and are not limiting. Additionally, in other embodiments, other waveforms (triangle, sine, etc.) could be used in place of the saw-tooth wave.

Figure 13:
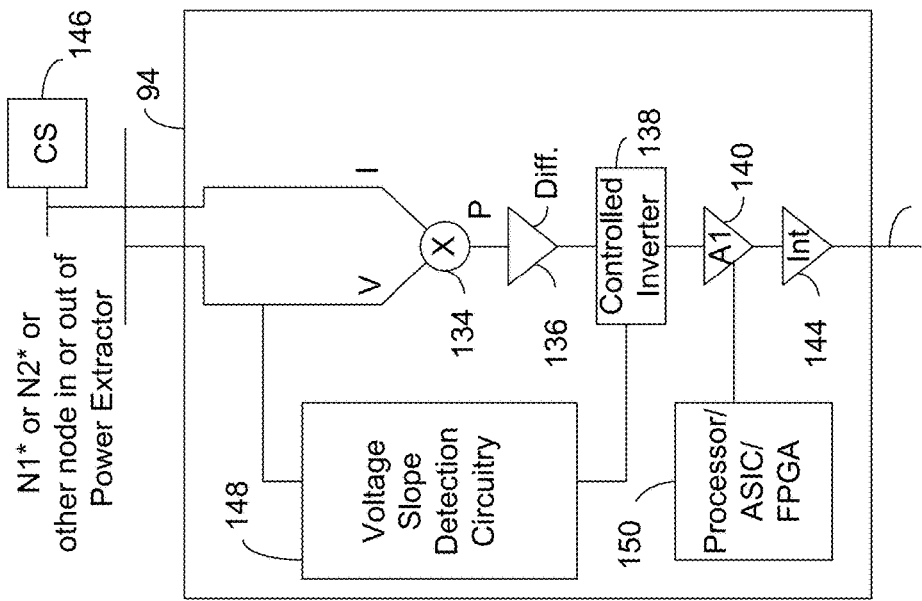
FIGS. 12 and 13 are each a block diagram illustrating power slope detection circuitry according to some embodiments.
Figure 12:
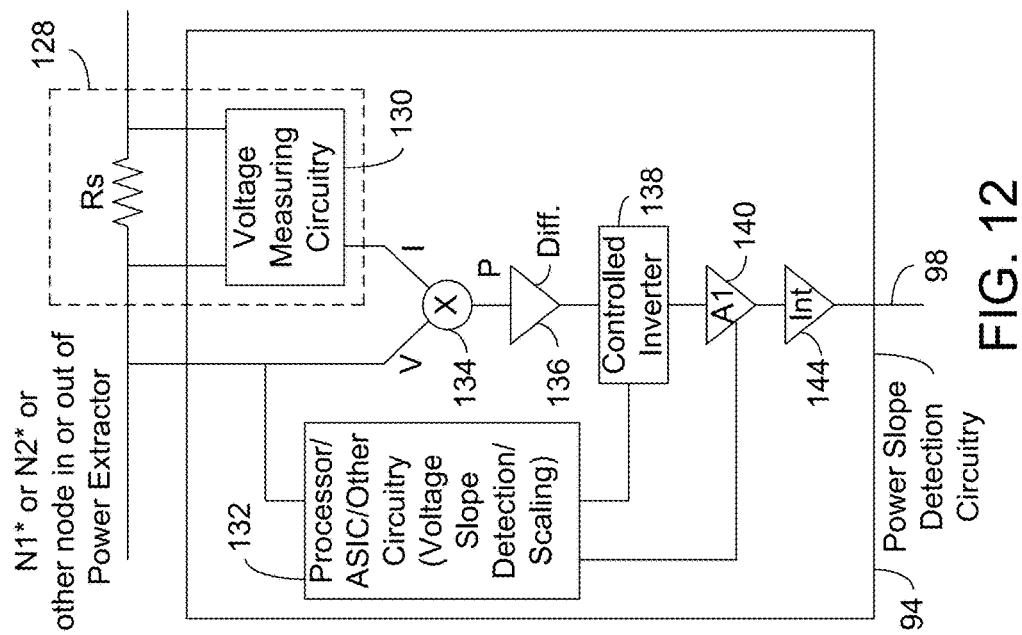

FIGS. 12 and 13 illustrate examples of power slope detection circuitry 94 that may be used in some embodiments of the invention. There are various other ways to implement the same or similar functions. In FIG. 12, a current measuring circuit 128 includes voltage measuring circuitry 130 internal to power slope detection circuitry 94 to measures the voltage across a small resistor Rs at N1 (or at another location) to determine the current (I=V/R). Although a small resistor Rs is shown, there are various other ways to measure current including through measuring a magnetic field. The voltage-level signal from N1 (i.e., VN1) (or at another location) and the current-level signal from N1 (i.e., IN1) (or at another location) are continuous signals. (In other embodiments, the voltage is deduced indirectly.) Multiplier 134 continuously multiplies the voltage and current at N1 to determine the power at N1 (PN1).

Differentiator 136 provided a signal responsive to changes in power ($\Delta P$) while processor 132 provides a signal responsive to changes in voltage ($\Delta V$). In some embodiments, differentiator 136 measures the power slope. $\Delta P/\Delta V$ represents the slope power at node N1 (or the other location). Maximum power is achieved when $\Delta P/\Delta V=0$. The slope of the power (or merely power change) can be determined in various ways. The power slope may be an instantaneous power slope determined through analog circuitry. Alternatively, a power slope or merely a power change can be detected through digital circuitry such as a processor by comparing samples. The processor could compare samples and determine a slope and a corresponding change in voltage (or a voltage slope). Alternatively, the processor could merely determine whether the power is increasing or decreasing and whether the corresponding voltage is increasing or decreasing. In some embodiments, differentiator 136 merely provides a magnitude of the power change (power slope) and in other embodiments, it provides both a magnitude and a direction. For example, the slope at point (1) in FIG. 9 is positive in direction while the slope at point (2) is negative in direction despite having a similar magnitude.

Power slope detection circuitry 94 includes voltage change detection circuitry 132, which may be a processor, application specific integrated circuit (ASIC), or other circuitry. Circuitry 132 may also perform scaling as discussed. In some embodiments, circuitry 94 detects a slope of voltage change and in other embodiments, and in other embodiments, it merely detects whether the voltage is increasing or decreasing. It may detect the change through analog or digital circuitry. In some embodiments, only the direction (i.e., not the magnitude) of the voltage change is relevant. Referring again to FIG. 9, example (1) involves an increasing voltage (positive) while example (2) involves a decreasing voltage (negative). Thus, in example (2) of FIG. 10, when differentiator 136 indicates a decrease in power, voltage change detection circuitry 132 indicates a decrease in voltage. When there is a decrease in voltage, controlled inverter 138 inverts the negative output of differentiator 136, which results in a positive number corresponding to the positive power slope at point (2). Thus, by combining the results of differentiator 136 and voltage change detection circuitry 132, power slope detection circuitry 94 can determine whether to increase or decrease the current. As shown in FIG. 10, when the power slope is positive (examples (1) and (2)), the duty cycle of switching circuitry 78 is decreased; when the power slope is negative (examples (3) and (4), the duty cycle is increased. In some embodiments, the output of controlled inverter 138 is scaled by a scalar (amplifier A1) 140, which puts the signal in a proper range to be compared with the waveform (as shown in FIG. 11). Further, in some embodiments, an integrated 144 may be used to act as a low pass filter and smooth out otherwise rapid changes.

In some embodiments, the switching control signal is dependent on the steepness of the power slope or amount of power change, and in other embodiments, the changes are incremental. In some embodiments, circuitry 94 does not model a power curve, it merely responds to detected voltage and current changes to move toward the maximum power, without being aware of where the maximum power on a curve. Indeed, it is not necessary to know what the power curve would look like. In other embodiments, circuitry 94 or other circuitry such as processor 172 in FIG. 25 models a power curve.

In some embodiments, the input (e.g., voltage and/or current) and the control loop may define the saturation limit for each of the inductors in power transfer circuitry 72. In other words, the saturation limit of each of the inductors may be independent of the power extractor output and switching frequency.

FIG. 13 shows how changes in voltage can be detected by analog detection circuitry 148 (e.g., differentiator, etc) in some embodiments. Additionally, an external current sensor 146 can measure the amount of current being transferred by the power extractor and communicate that information to power slope detection circuitry 94. Amplifier 140 can also be controlled by a processor, ASIC, or FPGA 150 based on various conditions including but not limited to weather conditions, and charge level of the load (e.g., battery).

Figure 14:
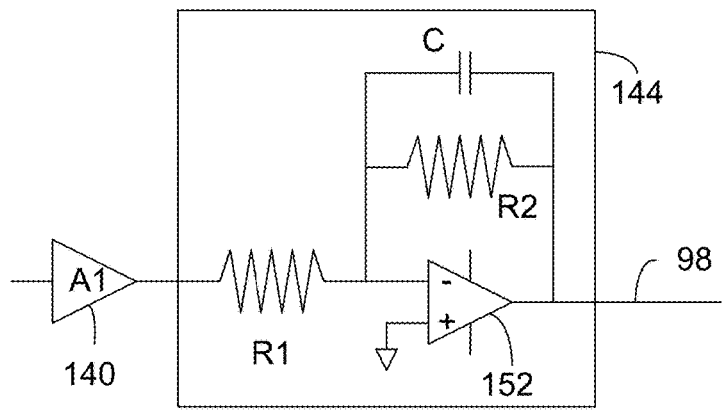
FIG. 14 is a block diagram illustrating an example of an integrator circuit that may be used in some embodiments.

FIG. 14 illustrates an example of the optional integrator 144 of FIGS. 12 and 13. Integrator 144 may be included in some embodiments of power slope detection circuitry 94 to dampen the switching control signal from power slope detection circuitry 94. Integrator 144 includes a resistor R1 at the input of an op amp 152 and a resistor R2 in parallel with a capacitor C. Charge stored in the capacitor is "bled off" by resistor R2. The bleeding off of charge by resistor R2 causes the output of integrator 144 to be lower over time than the input (as received from power slope detection circuitry). This reduced output reduces the impact (i.e., dampens) of switching control signal on the duty cycle of switching circuitry 78.

There are various other ways to obtain the switching control signal. Examples include doing all the analysis in a processor. Other examples, involve considering the saturation levels of the inductors. An example is illustrated in connection with FIG. 28. A phase-locked loop (PLL) may be used to detect on and off times of switches S1 and S2. This information could be provided to the processor which may use the information for various purposes. Two phase related signals may be used in connection with controlling the duty cycle.

Figure 15:
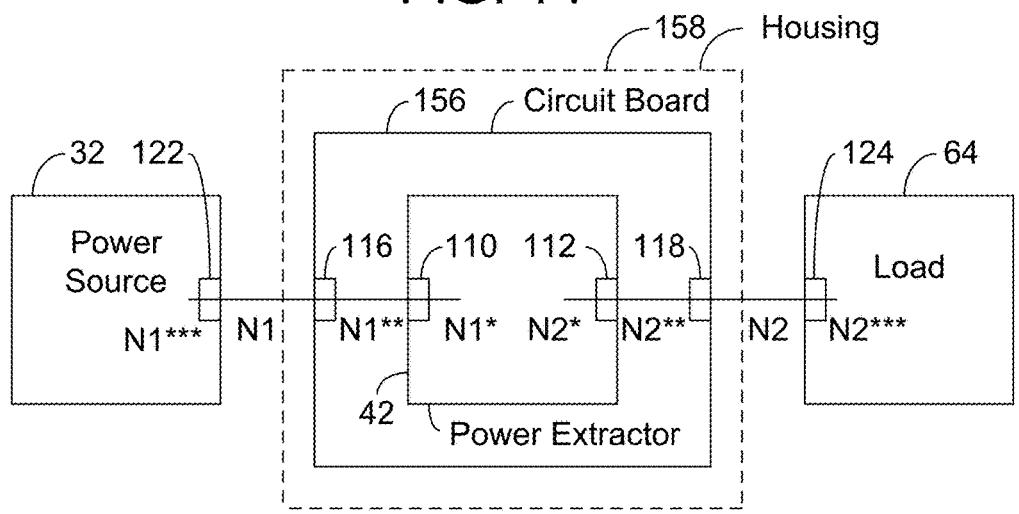
FIG. 15 illustrates various connectors for connecting a power source and a load to a power extractor and/or a circuit board according to some embodiments.

FIG. 15 shows several connectors (110, 112, 116, 118, 122, and 124) for connecting power source 32 and load 64 to power extractor 42 and/or a circuit board 156 as shown. Circuit board 156 may be in a housing 158. Circuit board 156 and housing 158 may be in a wide variety of forms including, for example, a stand alone box. Alternatively, circuit board 156 could be in a consumer electronics device (e.g., cell phone, personal data assistant (PDA)) or be a computer card in which case the load could be integrated in the housing as well, or in a variety of other implementations. As described below, in some implementations, the power source could be integrated with the housing. If the connector has a substantially different impedance than the surrounding nodes, then the different nodes (e.g., N1, N1*, N1**) can be considered separate nodes. If the connector has a relatively little impedance than the surrounding nodes, then the different nodes can be considered one node.

Figure 16:
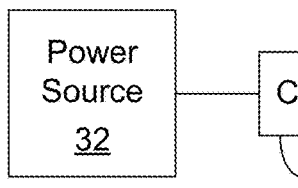
FIG. 16 shows a circuit between a power source and a node according to some embodiments.
Figure 17:
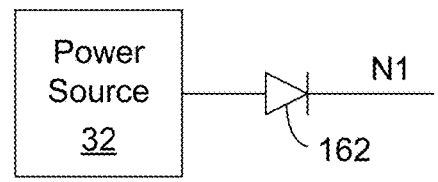
FIG. 17 shows a diode between a power source and a node according to some embodiments.

FIG. 16 shows that a circuit 160 can be included between power source 32 and node N1 in some embodiments. FIG. 17 shows that a diode 162 can be included between power source 32 and N1 in some embodiments.

Figure 18:
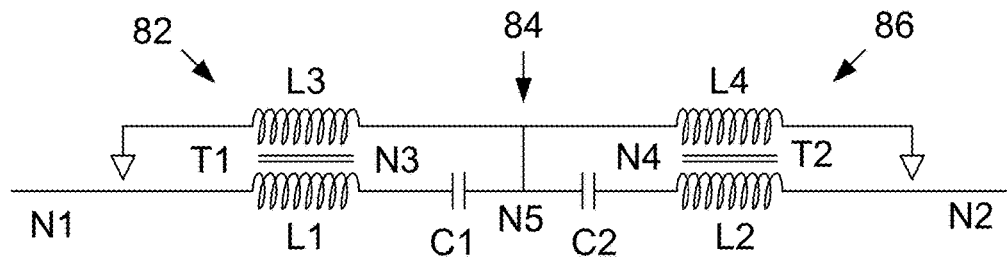
FIG. 18 illustrates an example of power transfer circuitry of FIG. 8.
Figure 19:
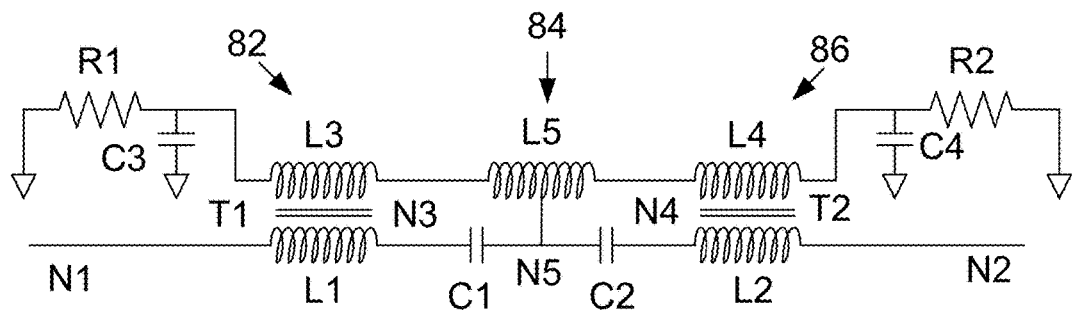
FIGS. 19-22 each illustrate an example of power transfer circuitry according to some embodiments.
Figure 20:
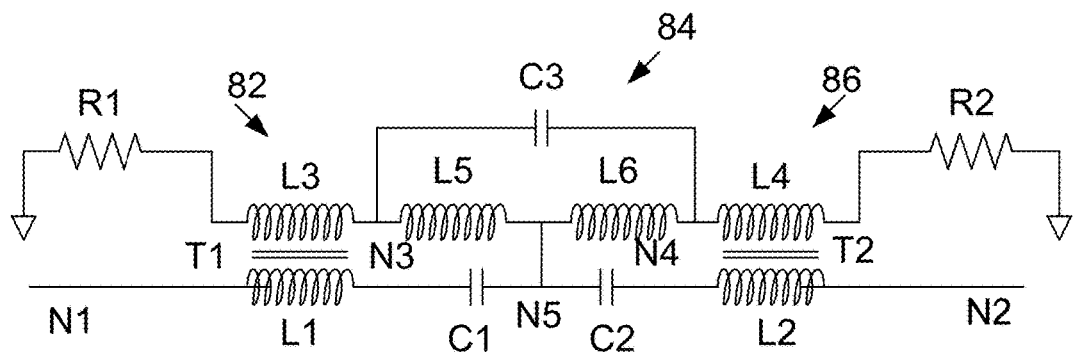
Figure 21:
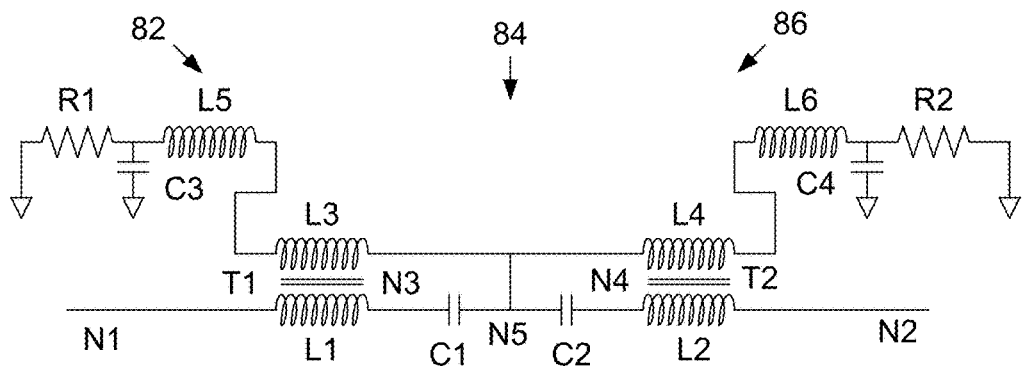
Figure 22:
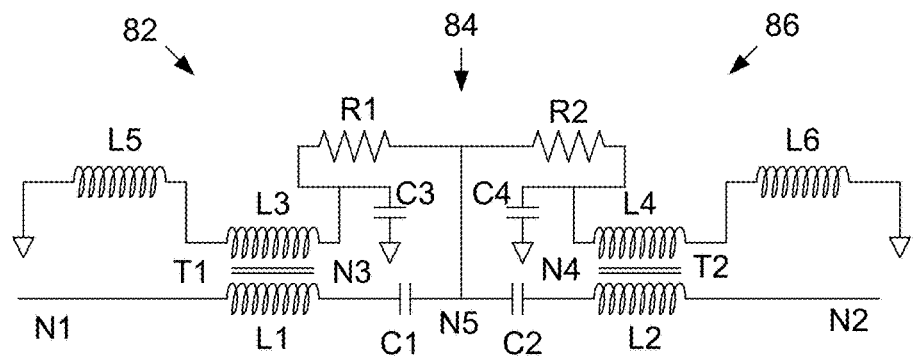

FIG. 18 reproduces the power transfer circuitry of FIG. 8 for convenience of comparison with alternative power transfer circuitry illustrated in FIGS. 19-22. The values of the resistors, capacitors and inductors (such as R1, R2 C1, C2, C3, C4, L1, L2, L3, L4, L5, and L6) are not necessarily the same in FIGS. 18-22.

Figure 23:
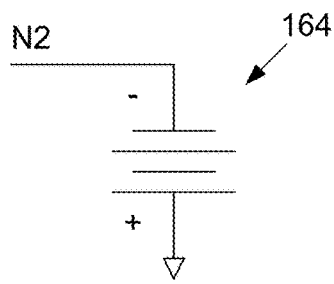
FIG. 23 illustrates a battery where the positive end of the battery is connected to ground.

FIG. 23 illustrates a battery 164 of which the positive end of the battery is connected to ground. N2 represents the node at the output of power extractor 42. In some embodiments, a battery 164 is connected to N2 such that the negative end of battery 164 is tied to N2 and the positive end is tied to ground. Referring to FIGS. 7 and 8, one reason to have the arrangement of FIG. 23 is that, in some embodiments, the voltages at N4 and N3 have opposite polarities. For example, if the voltage at N3 and N4 are VN3 and VN4, respectively, VN3 may be −VN4. In other embodiments, battery 164 can be connected such that the positive end is tied to N2 and the negative end is tied to ground. Further, in some embodiments, the voltage at N4 and N3 are not opposite voltages.

Figure 24:
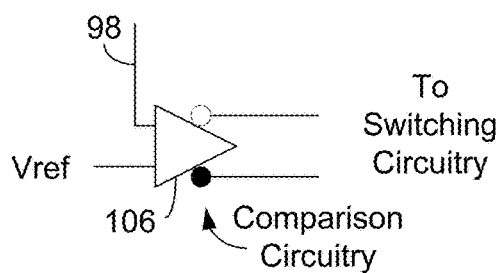
FIG. 24 illustrates comparison circuitry that may be used in some embodiments.

FIG. 24 illustrates an example of comparison circuitry that may be used in some embodiments of the invention. Comparison circuitry 106 can be any circuitry used to compare power change indication signal 98 with a reference signal (e.g., a voltage reference, $V_{ref}$) in order to regulate the duty cycle of the switching circuitry.

Figure 25:
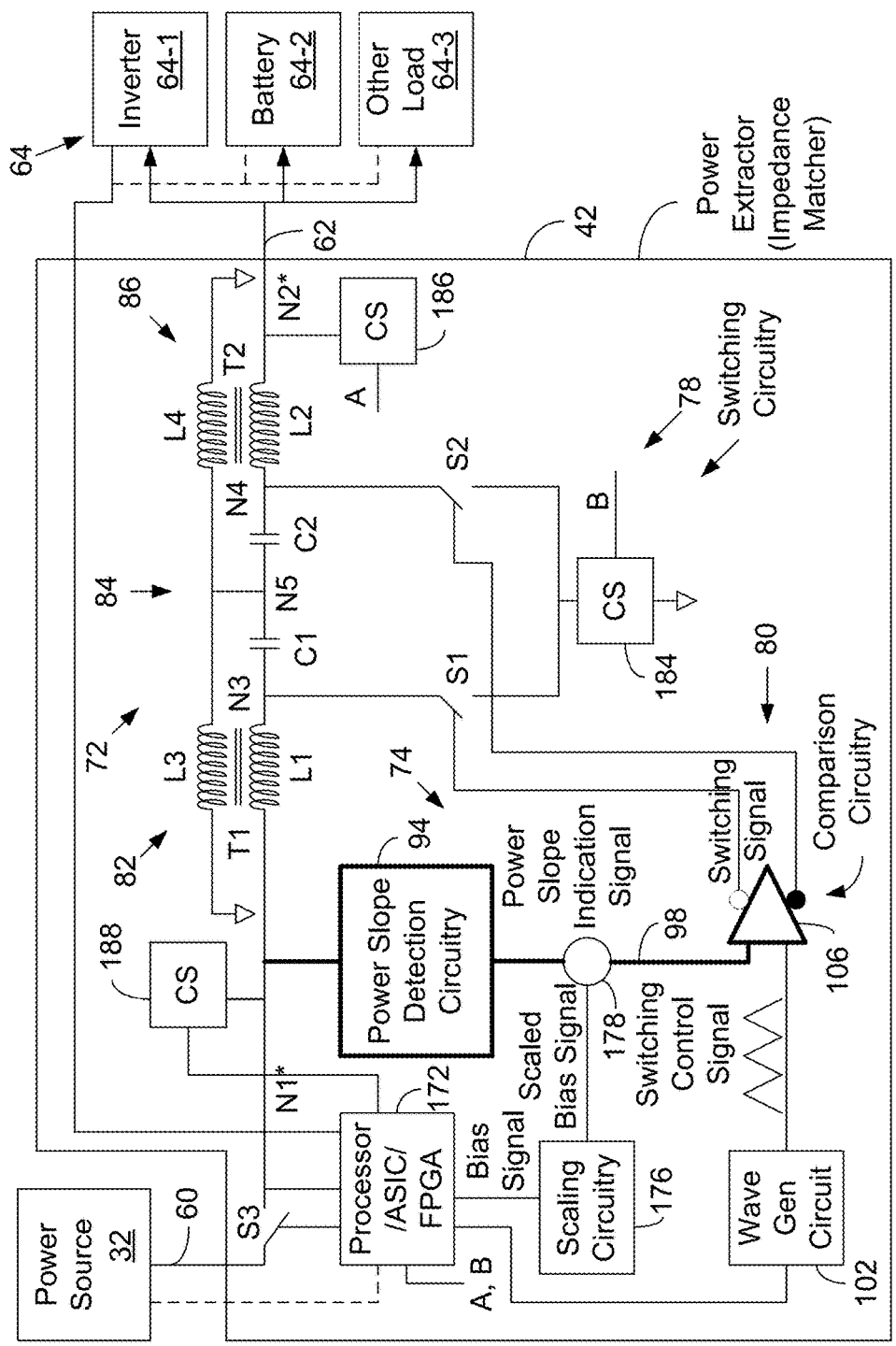
FIG. 25 illustrates a system including a power source, power extractor, and load according to some embodiments.

FIG. 25 is similar to FIG. 8, but includes additional circuitry including a processor/ASIC/and/or field programmable gate array (FPGA) 172 (hereinafter processor 172), scaling circuitry 176, current sensors 184, 186, and 188. Processor 172 receives signals indicative of the sensed current as well as voltage of node N1*. Letters A and B show connections between current sensors 184 and 186 and processor 172. In some embodiments, processor 172 also gathers information and/or provides control to sub-loads inverter 64-1, battery 64-2, and/or other load 64-3 of load 64. The current information can be used to indicate such information as the rate, amount, and efficiency of power transfer. One reason to gather this information is for processor 172 to determine whether to be in the protection mode (such as the second mode) or the ordinary operating mode (such as the first mode). In a protection mode, there are various things processor 172 can do to provide the power extractor 42 or load 64. One option is to open switch S3. Another option is to open a switch S4 shown in FIG. 26. Another option is to provide a bias signal to scaling circuitry 176 which is combined in circuitry 178 with a power slope indication signal to create the switching control signal on conductor 98. For example, if the bias signal causes the switching control signal to be very high, the duty cycle would be low causing the current to be small. The regulation of power in the protection mode can be to completely shut off the power or merely to reduce the power. In the protection mode, the goal is no longer to maximize the power transferred. In some embodiments, the bias signal is asserted for purposes other than merely protection mode.

FIG. 26 illustrates a processor control line to control a switch, S4, which can be opened to shut off any power transfer from power extractor 42 to a load (e.g., inverter 64-1, battery 64-2, and/or other load 64-3). Processor 172 also controls the routing of power between different sub-loads (e.g., inverter 64-1, battery 64-2, or other load 64-3) in some embodiments. Furthermore, temperature sensors 192-1, 192-3, and 192-3 are shown as being connected to different loads. Based on the temperature (e.g., too much heat), the processor can cause switch S4 to open or close or otherwise regulate power, such as through the bias signal or opening switch S3. Power extractor 42 can operate in a protective mode based on any device limiting condition. Examples of device limiting conditions include one or more of the following: excessive heat, voltage, power, or current in N1, power extractor 42, and/or N2. There may be other device limiting conditions. The power extractor may sense the state of external switches such as dip switches or get updates through a memory (such as a flash memory) to determine load characteristics that may be considered in deciding whether to enter into a protective mode.

FIG. 27 illustrates two different battery loads, 64-1-1 and 64-1-2, connected to output node N2 by a switch, S5. This configuration illustrates the functional flexibility of power extractor 42 in various embodiments. Given both the source-side and load-side impedance matching characteristics, power extractor 42 automatically adapts to the load and provides power to the load. In other words, the output of power extractor 42 is power—the output voltage and the output current that comprise the power are not fixed. The output voltage and output current automatically adapt to the load, without reducing the power. In other words, power extractor 42 may operate independent of any voltage. Thus, the output power may be unregulated, with the exception of the protection mode.

For example, in some embodiments, power extractor 42 might extract 60 Watts of power from power source 32 to be transferred to battery 186-1. If battery 64-2-1 is a 12 Volt battery, then power extractor 42 might provide 5 A of current at 12 Volts to charge the battery. If battery 64-2-1 is switched to or swapped for a 15 Volt battery 64-2-2, then power extractor 42 will still provide 60 Watts of power to charge the battery in the form of 4 A of current at 15 Volts. While this example illustrates the adaptability/flexibility of power extractor 42, it should be noted that the output voltage from power extractor 42 may need to be slightly higher than the battery voltage in order to cause current to flow into the battery.

In the above example, and in some other embodiments, the power extractor feedback point may be based on output power transfer, rather than traditional systems where the feedback point is based on output voltage or current. Other embodiments operate differently.

Figure 28:
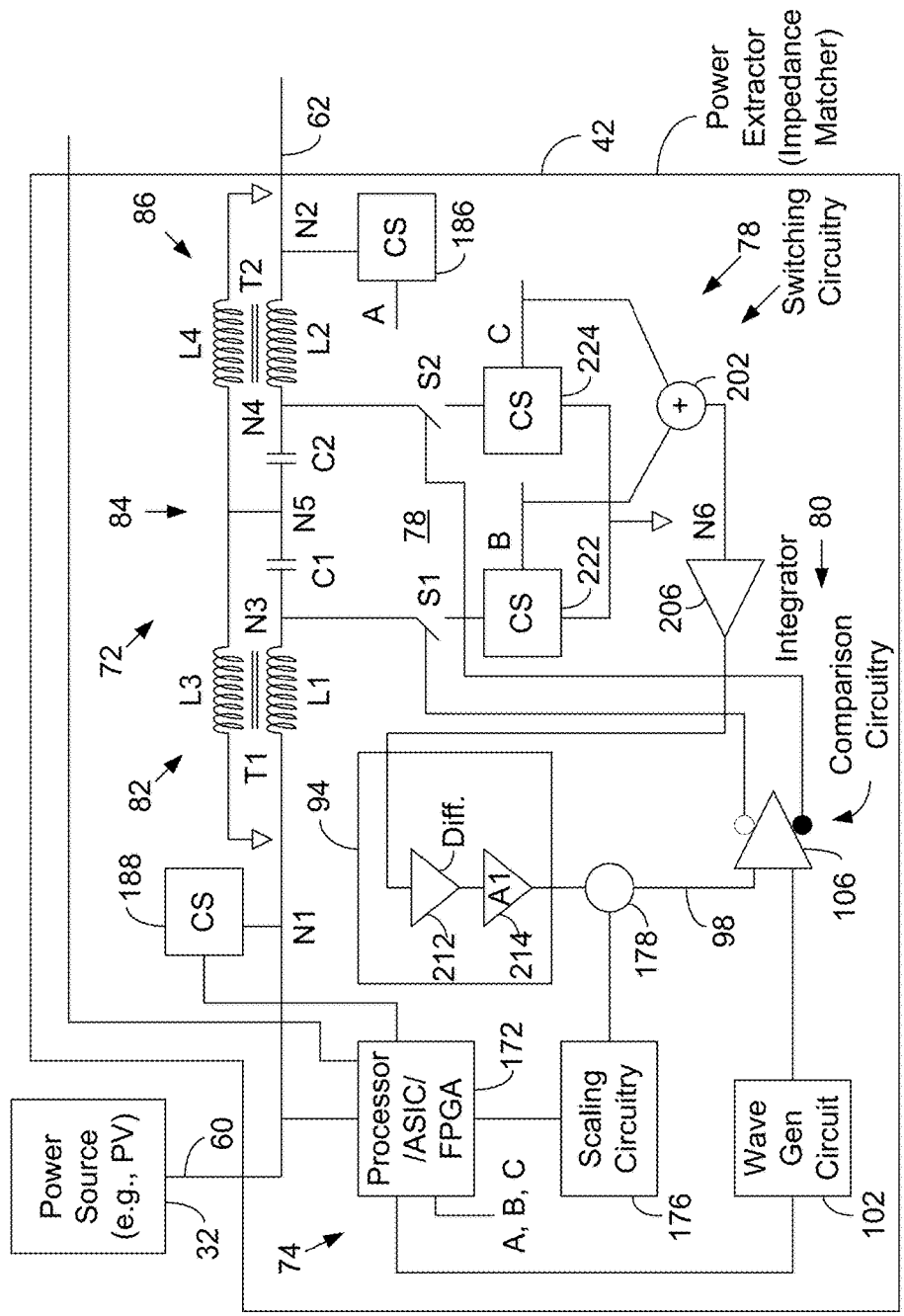
FIGS. 28 and 29 illustrate various details of a power extractor according to some embodiments.

FIG. 28 illustrates further detail of power extractor 42 according to other embodiments. Current sensors 222 and 224 provide signals indicative of the current through switches S1 and S2, which are summed in summer 202. Power may be related to the average current from summer 202. These may be provided to an integrator 206 to provide an signal indicative of the power, which is differentiated by differentiator 212 and amplified by amplifier 214. Voltage change (or voltage slope) may be considered as mentioned above.

Figure 29:
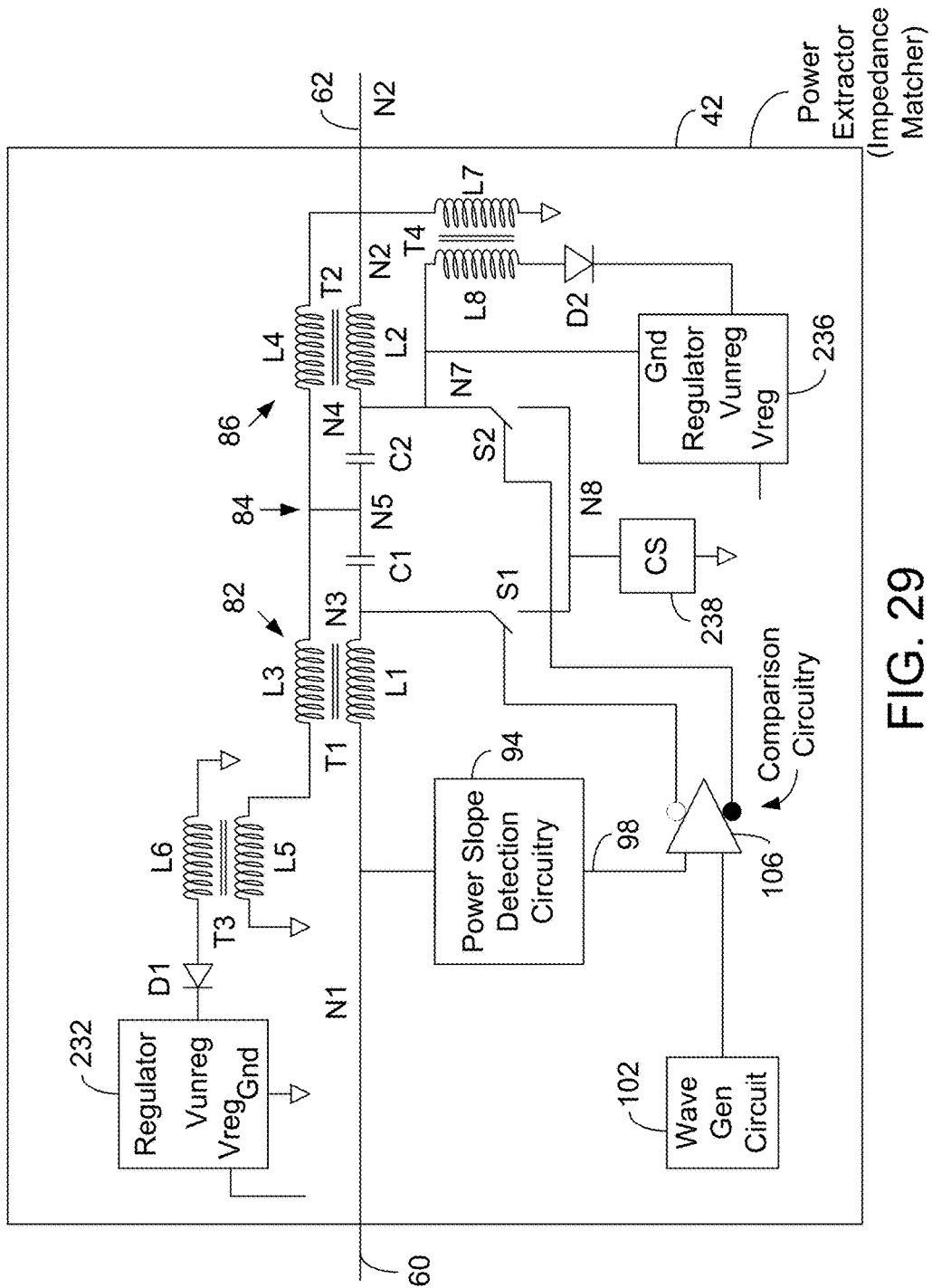

FIG. 29 illustrates voltage regulators 232 and 236 which take unregulated voltage from power extractor 42 and provide a regulated voltage as needed (e.g., to power various circuits within power extractor 42). The unregulated power is provided to regulator 232 through a transformer T2 (inductors L5 and L6) and diode D1. The unregulated power is provided to regulator 236 through a transformer T4 (inductors L7 and L8) and diode D2.

Figure 30:
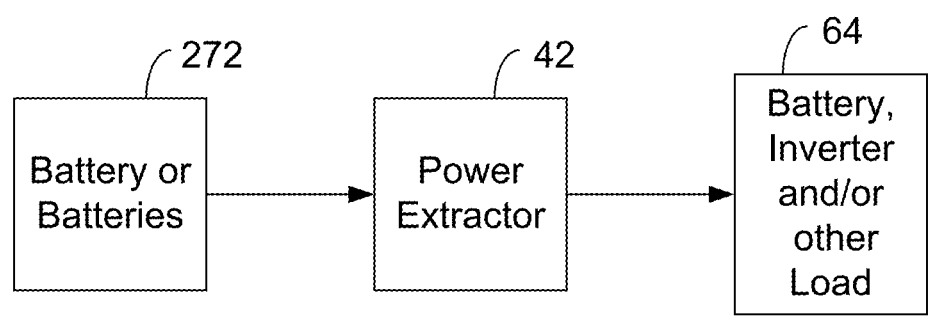
FIG. 30 illustrates a power extractor coupled between one or more batteries and a load according to some embodiments.
Figure 31:
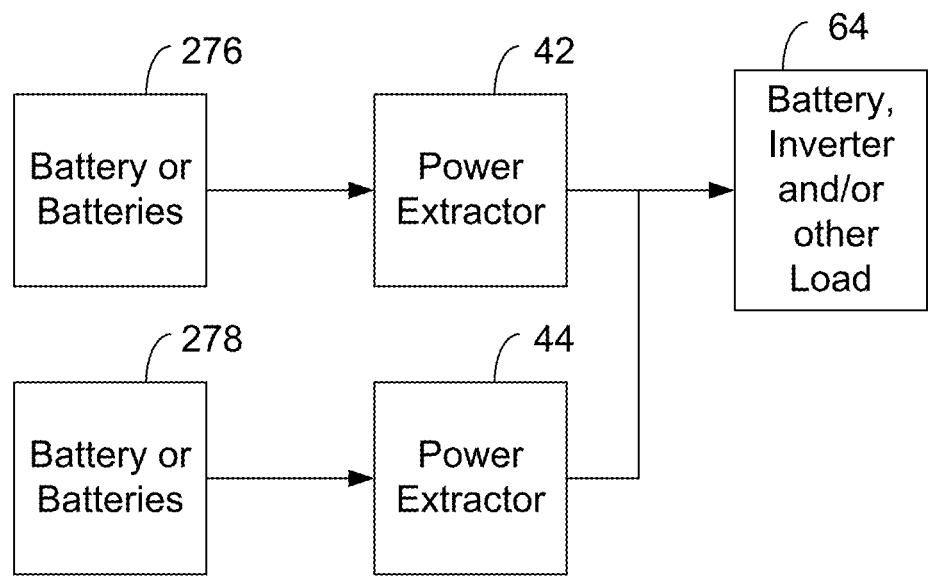
FIG. 31 illustrates a parallel configuration of batteries and power extractors coupled to a load according to some embodiments.

Power extractor 42 may be used in transferring power from one or more batteries 272 to a load 64 which may include another battery. FIG. 30 illustrates a battery or batteries 272 as being the power source. A reason to use power extractor 42 with batteries as the source is that the batteries with lower power and a lower voltage can be used to charge other batteries including with a higher or lower voltage. Given that power extractor 42 extracts DC power in whatever form it is available (e.g., not at specific or fixed voltage or current) and outputs power in whatever form needed by the load (e.g., not at a specific or fixed voltage or current), power extractor 42 is flexible and adaptable—within safety or other reasonable limits, there are no restrictions as to what type of source and/or load can be connected to power extractor 42. For example, power extractor 42 can transfer the available power in a 9 Volt battery to charge a 15 Volt battery. In another example, power extractor 42 can transfer power from two 5 Volt batteries to a 12 Volt battery. The flexibility and adaptability of power extractor 42 is in contrast to traditional charge controllers and other power transfer systems where power transfer from input to output is a byproduct of output voltage regulation. FIG. 31 illustrates parallel power extractors 42 and 44 receiving power from battery power sources 276 and 278, respectively, and providing power to load 64.

Figure 40:
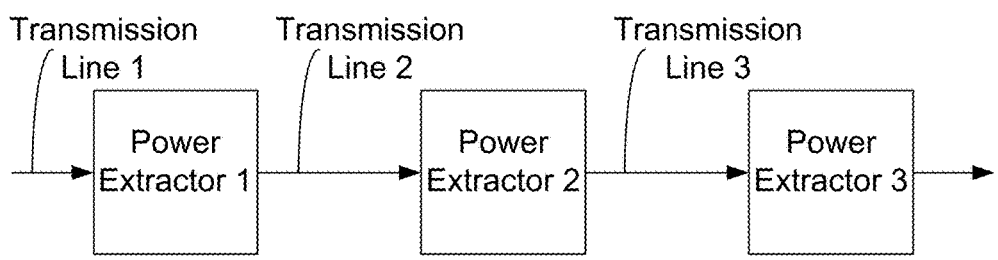
FIG. 40 illustrates power extractors and transmission lines according to some embodiments.

FIG. 32 illustrates a side view of an integrated circuit chip (IC1) including a photovoltaic power source 284 and power extractor 286 fabricated onto a substrate 282 of IC1. Power extractor 286 may be the same as or somewhat different than power extractor 42. FIG. 33 shows a top view of IC1 including photovoltaic power source 284, power extractor 286, first and second nodes and a chip interface 288. There may be a diode between power extractor 286 and source 284. In practice, the layout could be somewhat different with photovoltaic power source 284 taking up more or less service area than is shown. Likewise, power extractor 286 could take up more or less area than is shown. FIG. 34 shows a plurality of IC chips IC1, IC2, . . . IC25 similar to IC1 of FIGS. 32 and 33 joined by a frame 296. The integrated circuit may also contain various function circuitry in addition to the power extractor and the power source. FIG. 32 illustrates that the power extractor can be on a very smaller scale. Conversely, power extractor 42 may be on a very large scale, for example, in high power embodiments. FIG. 40 may be an example of such high power embodiments. For example, parts of the control loop such as power slope detection circuitry 94 may be up to a substantial distance from node N1. In some embodiments, the distance is less than one meter, and in other embodiments, it is more than one meter and it may be substantially more than one meter. Alternatively, the power slope detection circuitry and power transfer circuitry may be close together in the same container or housing. Optical coupling or magnetic coupling may be used in various places including between node N1 and the power change detector.

Figures 35, 36, 37:
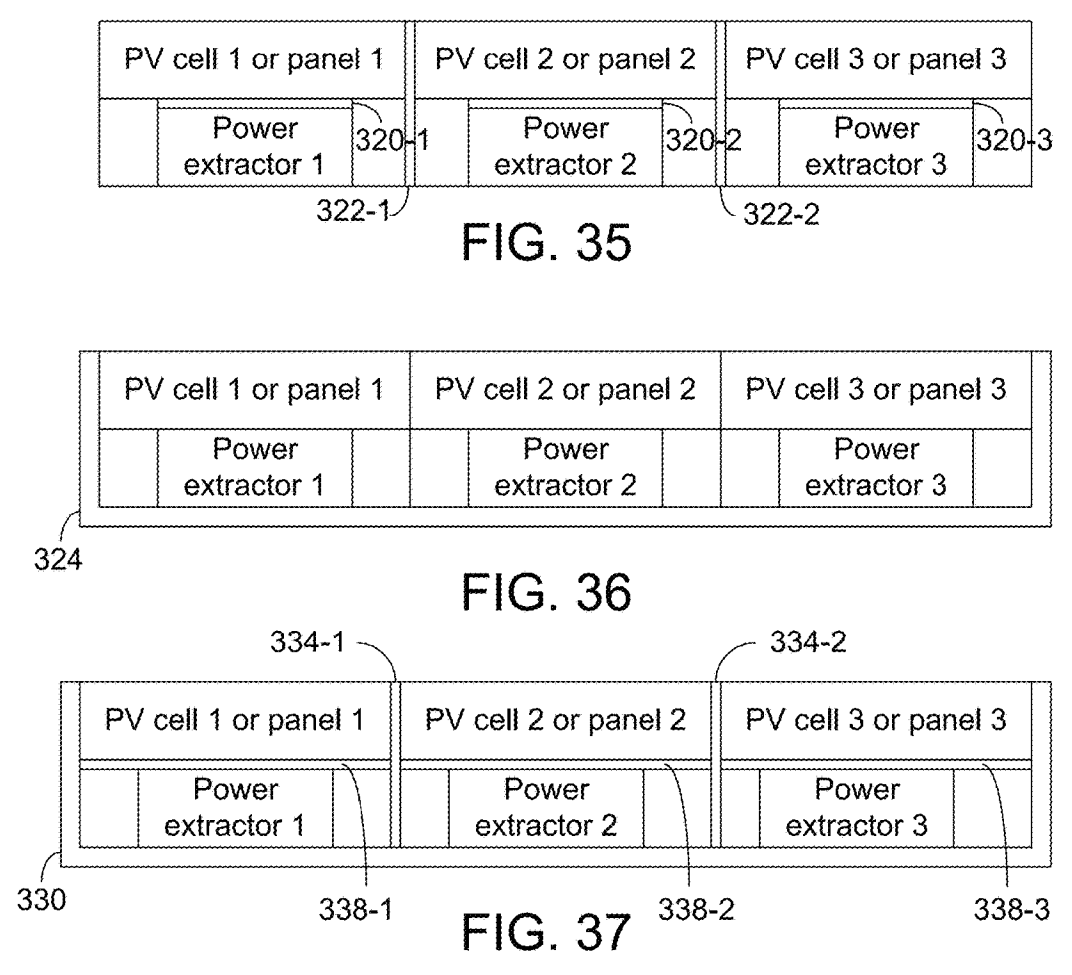

FIGS. 35, 36, and 37 illustrate different configurations for connecting one or more power extractors (power extractors 1, 2, and 3) to one or more photovoltaic (PV) sources according to various embodiments. For example, in FIG. 35, PV power sources (e.g., PV cells or PV panels) are directly connected together and to power extractors 1, 2 and 3, through connectors 320-1, 320-2, and 320-3, and 322-1 and 322-2, which may be glues, adhesives, mounting brackets, and/or other connectors in various embodiments. In FIG. 36, PV sources 1, 2, and 3 and power extractors 1, 2, and 3 are directly connected while the entire unit is supported by an external frame 320. In FIG. 37, PV sources are connected to each other and to power extractors 1, 2, and 3 via frame elements 330, 334-1, 334-2, 338-1, 338-2, and 228-3.

Figure 38:
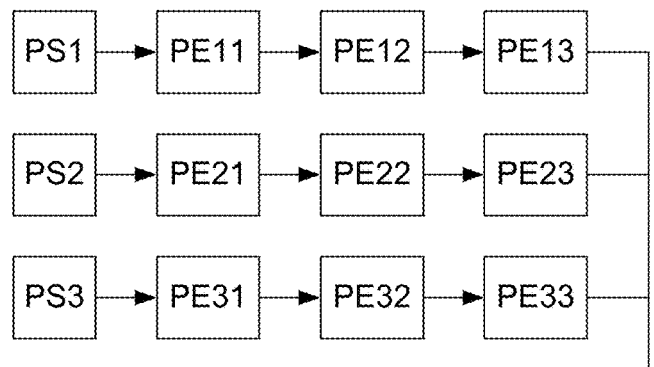
FIG. 38 illustrates parallel groups of serial power extractors with each group coupled to a power source according to some embodiments.
Figure 39:
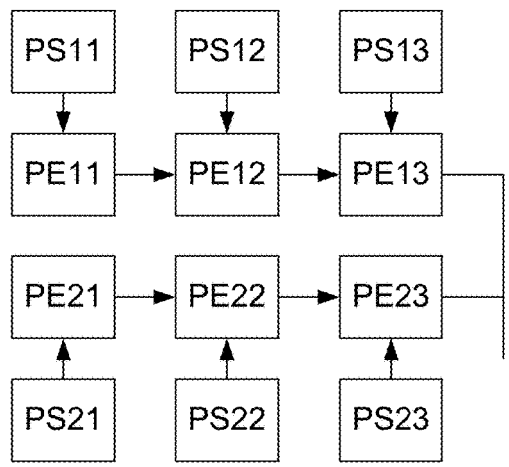
FIG. 39 illustrates parallel groups of power extractors with each power extractor coupled to a power source according to some embodiments.

FIGS. 38 and 39 illustrate various configurations for connecting multiple power sources and multiple power extractors according to various embodiments. For example, FIG. 38 shows power extractors PE11, PE12, and PE13 in series to increase voltage from a power source S1. Parallel power extractors PE21, PE22, and PE23 in series with power source PS2, and PE31, PE32, and PE33 in series power source PS3 are combined to increase current. FIG. 39 is similar, but each power extractor is coupled to a power source (PS11 to PE11, PS12 to PE12, PS13 to PE13, PS21 to PE21, PS22 to PE22, and PS23 to PE23).

FIG. 40 illustrates the placement of power extractors in one or more transmission lines. Of course, the magnitude of the power that may be transferred through power extractors 1, 2, and 3 in FIG. 40 is far greater than may be transferred in the integrated circuit of FIGS. 32-34.

Figure 41:
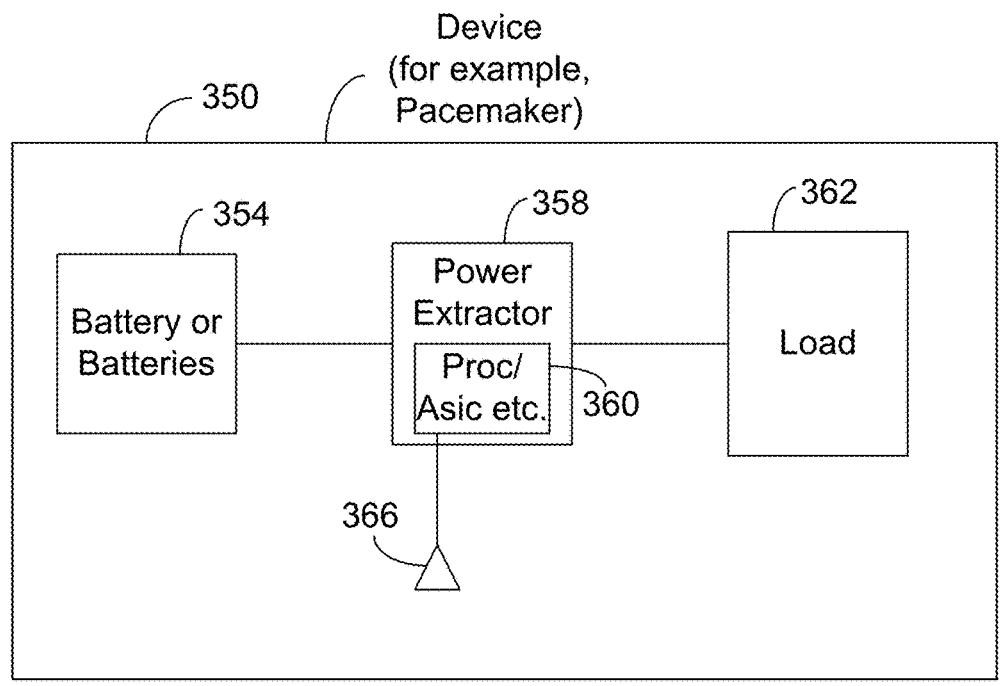
FIGS. 41 and 42 illustrate a power extractor used in a device according to some embodiments.

The power extractor of the invention may be used in connection with many different types of devices. For example, FIG. 41 illustrates the use of a power extractor 358 in a device 350 such as a pacemaker. A pacemaker device is used in this example by way of illustration only; other types of devices may be similarly be used in other embodiments. Power extractor 358 extracts power from battery or batteries 354 for power for a load 312 (e.g., the pacemaker itself). Power extractor 358 includes a processor/ASIC/or other circuitry 360 to determine battery usage and/or battery life in the pacemaker. The information can be communicated through an antenna 366. Based on that information, a doctor or technician or other person can send control information to processor 360 to bias the power extractor such that battery power is conserved, optimized, etc. in device 302 as desired. That is, it is not necessarily desirable to use the battery with the most power, but rather conservation of power may be more desirable. The bias signal of FIG. 25 may be useful for helping with battery conservation.

Figure 42:
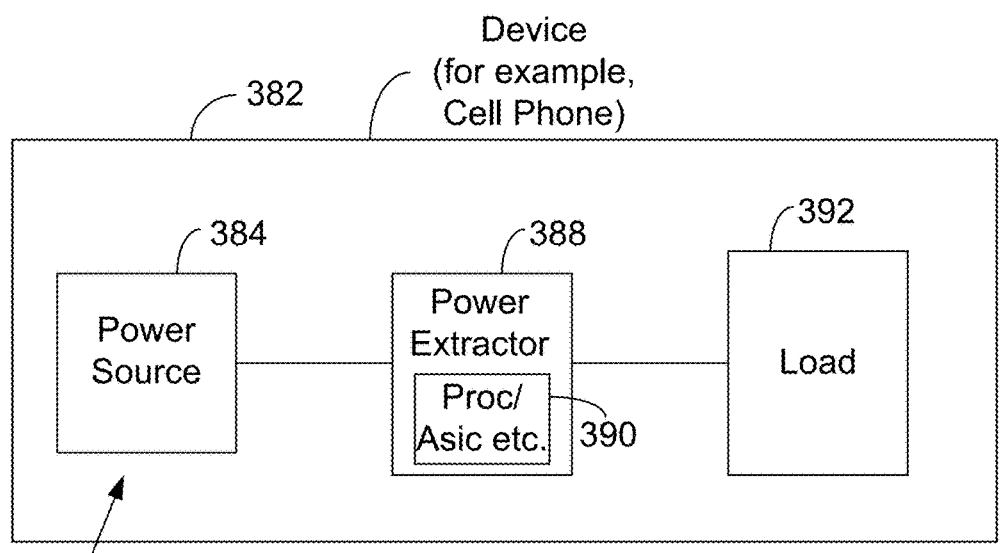

FIG. 42 illustrates the use of a power extractor 388 in another device 382, such as a cell phone. Again, a cell phone is used by way of example and illustration; other devices may incorporate a power extractor in similar fashion. Power extractor 388 is included in device 382 to extract power from a power source 384. Example sources of power can include light (including solar) power, heat (e.g., body heat), energy from motion (e.g., walking, running, general body movement, etc.), wind, battery, converting infrared to electrical energy, etc. Any electrical power that can be generated by power source 384 can be extracted by power extractor 388 and transferred to load 392 to power device 382. Processor 390 may be used control a desirable mode, for example, getting the maximum power out of a solar cell or thermal couple power source, or trying to converse battery power when the battery gets low. The device could have a combination of power sources. Thus, in some embodiments, power extractor 388 can be used to charge, either partially or fully, a cell phone battery without having to plug device 382 into a traditional electrical outlet.

Figure 43:
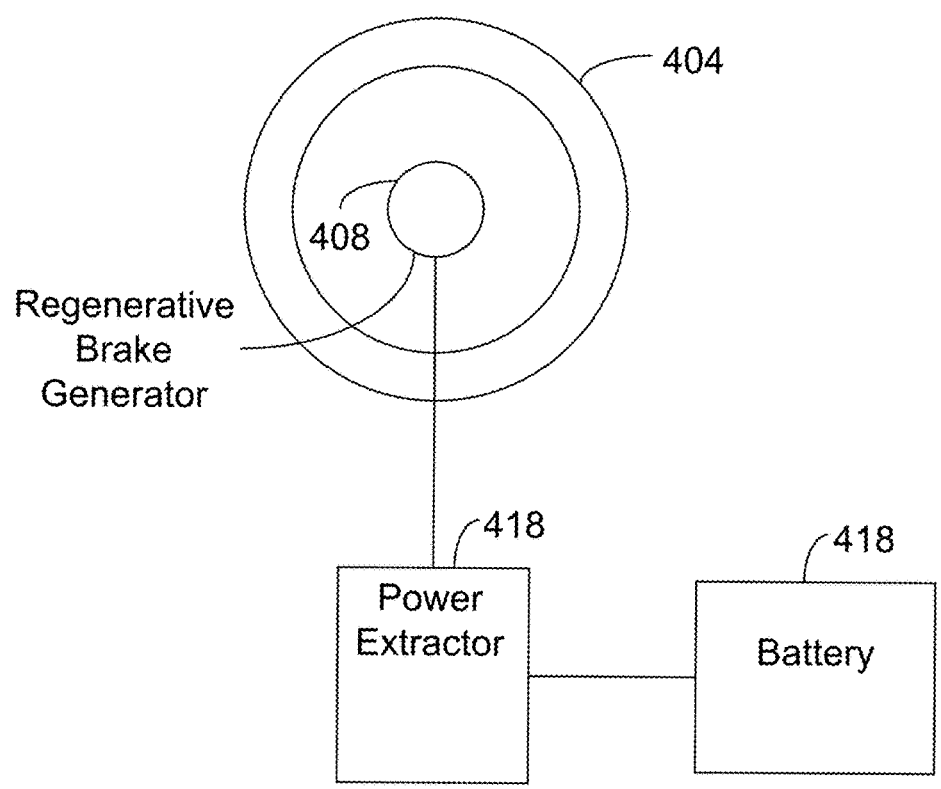
FIG. 43 illustrates a system with a power extractor coupled between a regenerative generator and a battery according to some embodiments.

As another example, FIG. 43 illustrates a vehicle wheel 404 with a regenerative brake generator 408 which provides power to power extractor 418 to charge a battery 418. Power extractor 418 may seek to get the maximum power out of generator 408.

Figure 44:
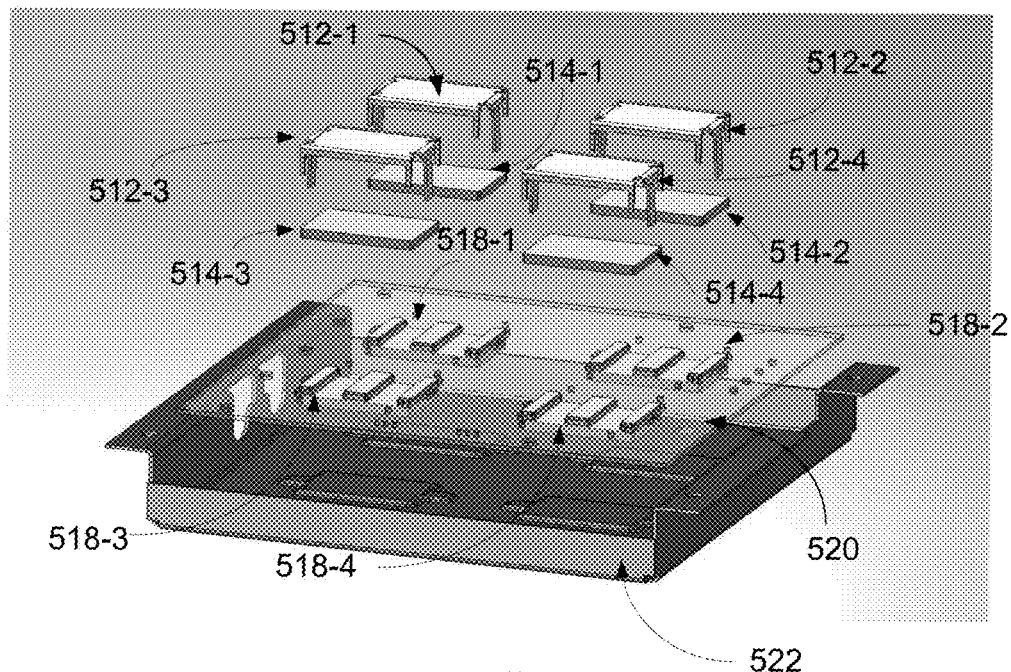
FIG. 44 illustrates a planar inductive device assembly using transformer clips.

FIG. 44 illustrates transformer clips 512-1, 512-2, 512-3, and 512-4 that may be used to provide cooling for planar inductive devices such planar inductance coils or planar transformers including I-cores 514-1, 514-2, 514-3 and 514-4 and E-cores 518-1, 518-2, 518-3, and 518-4 supported by a printed circuit board (PCB) fabrication 520 placed in a chassis 522. Chassis 522 may be attached on a backside of a solar cell, solar panel, or other power source. Clips 512 may be made of aluminum, copper, or some other thermally conductive material. A thermal heat paste or other heat conductor may be used to help with heat conduction. Of course, the system of FIG. 44 is not be used in many embodiments.

Figure 45:
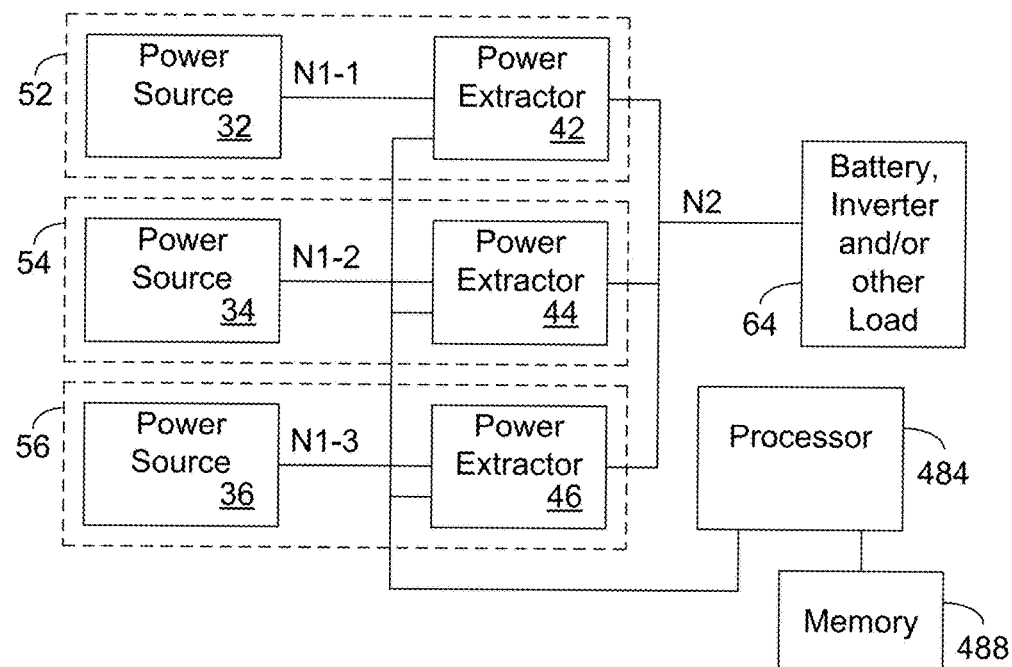
FIG. 45 illustrates a system similar to that of FIG. 2 with a central processor to gather data from or provide signals to the power extractors according to some embodiments.

FIG. 45 is similar to FIG. 2 except that a processor 484 communicates with power extractors 42, 44, and 46. The communication may be in just one or in both directions. Examples of the data or other information communicated are provided in connection with FIG. 46. Memory 488 can hold data for future analysis.

Figure 46:
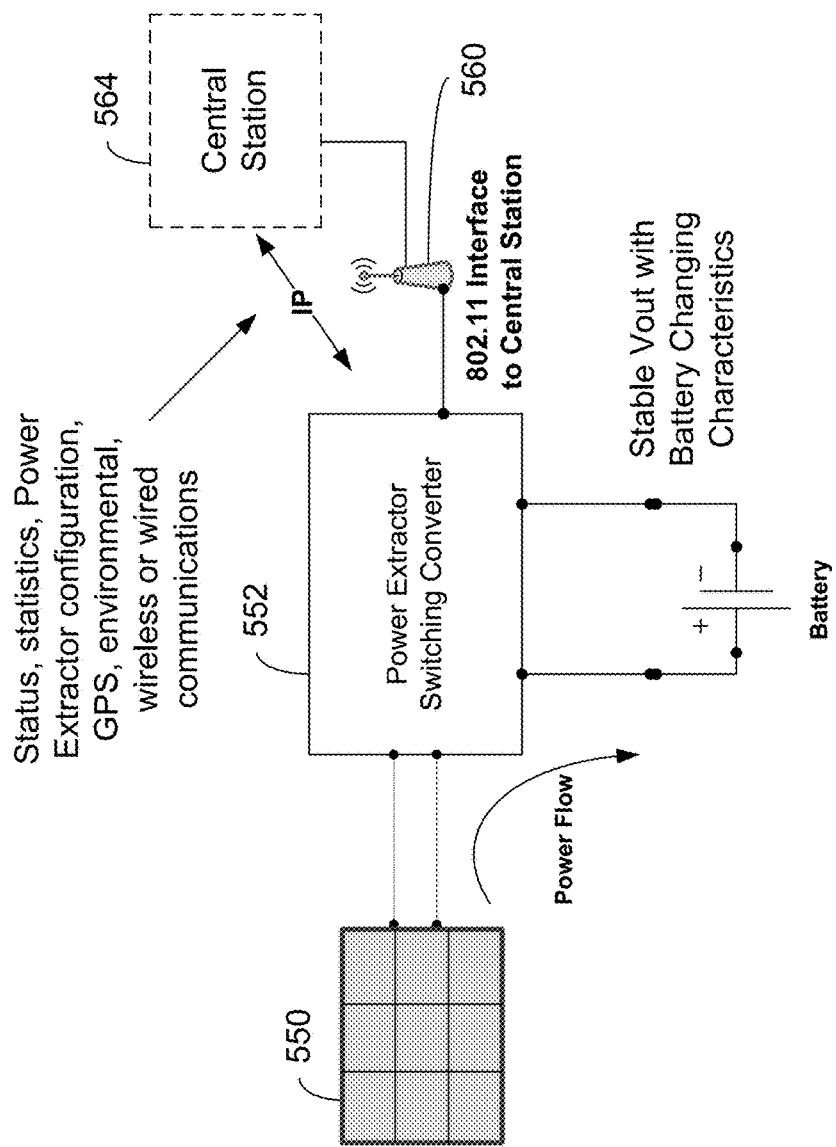
FIG. 46 illustrates a system with a power supply, power extractor, and central station to gather data from the power extractor or supply signals to the power extractor according to some embodiments.

FIG. 46 illustrates a system with a power source 550 to provide power to a power extractor switching converter (PESC) 552 which may be the same as power extractor 42. In addition to controlling PESC functions, a processor (such as a microprocessor or digital signal processor) in PESC 552 may collect statistical information about all stages of the power conversion and communicates real time telemetry, power statistical data, and energy statistical data to a central station and also receives real time data power control algorithms, administrative information, sensor management commands, and new software images from the central station. The gathered information (including one or more of the following: status, statistics, power extractor configuration, GPS (global positioning system) information, and environmental information) is provided by the processor in PESC 552 to a processor in a central station 564 through wired or wireless (560) communication. Processor 484 and memory 488 of FIG. 45 are examples of components of central station 564. A communication subsystem (for example, Ethernet) allows the communication between the processor and the central station 564. The processor in PESC 552 may include input line side DC voltage and current sensors, power stage output voltage and current sensors, output side DC signal sensing and output line side DC sensors.

Various additional components may be used in the above-illustrated components. For example, a fuse and blocking diode may be placed in parallel with a load. If the fuse is blown because the diode is forward biased, it may be used to provide information that there was excessive current or voltage. The information may be of immediate use to place the system in a protective mode or it may be of use for later diagnostic information. A fuse may also be in series between the extractor and the load.

In some embodiments, circuitry such as a thermocouple device may be used to recapture heat from the power extractor and create power from it.

In some embodiments, the power may be delivered in discrete packets.

Figure 47:
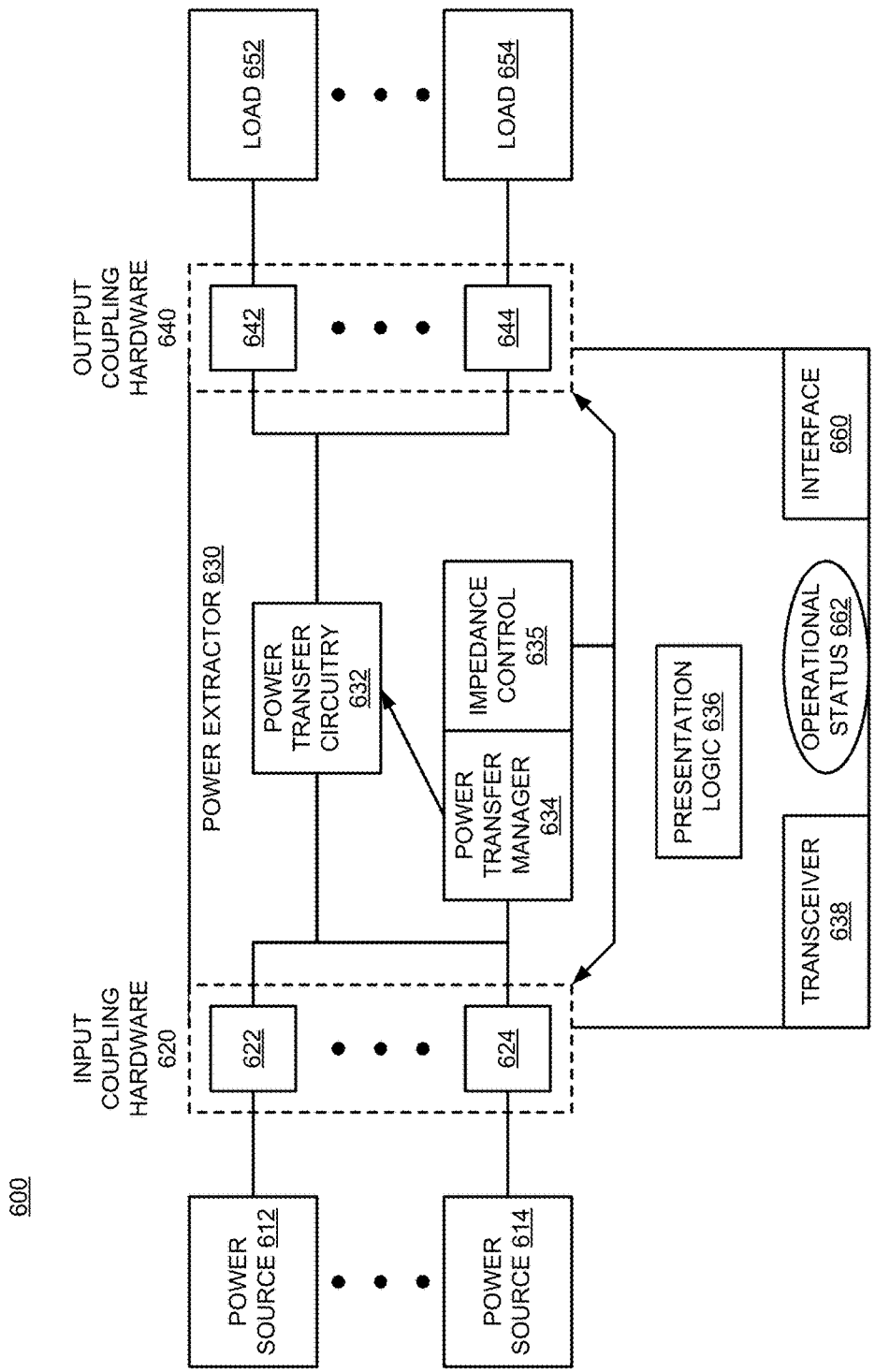
FIG. 47 illustrates a system with multiple power sources, a power extractor, and multiple loads according to some embodiments.

FIG. 47 illustrates a system with multiple power sources, a power extractor, and multiple loads according to some embodiments. System 600 provides a general use case scenario for power extractor 630. Power extractor 630 is an example of a power extractor according to any embodiment described herein. There may be one or more power sources 612-614 coupled to power extractor 630. Note that different power sources may require different coupling hardware. Input coupling hardware 620 includes interface circuits that couple the input power sources to power extractor 630. In some embodiments, interface circuit 622 is different from interface circuit 624. However, they may be the same.

Power sources 612-614 may be any type of DC power source (referred to as a power source or an energy source). Examples of DC power sources that may be used in accordance with embodiments of the invention include, but are not limited to, photovoltaic cells or panels, a battery or batteries, and sources that derive power through wind, water (e.g., hydro-electric), tidal forces, heat (e.g., thermal couple), hydrogen power generation, gas power generation, radioactive, mechanical deformation, piezo-electric, and motion (e.g., human motion such as walking, running, etc.). Power sources may include natural energy sources and man-made power sources, and may be stable (providing an essentially constant power but variable in magnitude) and unstable (providing power that varies over time). Input coupling hardware 620 may be considered to include the entire interface (e.g., from the cable/wire/trace to the connector/pin to the circuitry), or simply include the interface circuitry. The interface circuitry may include any type of discrete components (e.g., resistors, capacitors, inductors/transformers, diodes, etc.) as is described herein, and as may otherwise be known in the art.

Additionally, in some embodiments, input coupling hardware 620 includes switches (e.g., power field effect transistors (FETs)) or other similar mechanisms that enable one or more power sources to be selectively disconnected or decoupled from power extractor 630. The coupling and decoupling of power sources can be performed, for example, via control signals from a management portion of the power extractor.

Similar to the input side, either power extractor 630 includes, or else there is coupled to power extractor 630 in system 600, output coupling hardware 640. Output coupling hardware 640 includes interface elements 642-644. There may be a one-to-one relationship between interface elements 642-644 and loads 652-654, but such a relationship is not strictly necessary. One or more loads can be coupled via the same output coupling hardware. A similar configuration can exist in input coupling hardware 620—the relationship of elements to sources may be one-to-one, or some other ratio. With a ratio other than one-to-one, there may be restrictions on selectively bringing individual sources or loads on- and off-line. Such restrictions could result in reduced efficiency (from an ideal otherwise potentially achievable) in impedance matching, though group matching may not necessarily be less efficient. Thus, loads and/or sources may be handled as groups, which can then be brought online or offline as a group, and impedance matched as a group.

Loads 652-654 may also be selectively coupled to power extractor 630 via output coupling hardware 640. One or more loads may be coupled or decoupled via a control signal in accordance with a management strategy. Power transfer manager 634 generally represents any type of power transfer management circuit, and may include one or more processing circuitry elements, such as microprocessors, field programmable gate arrays (FPGA), application specific integrated circuits (ASIC), programmable logic arrays (PLAs), microcontrollers, etc. Management of the power transfer is performed by power transfer manager 634, which can be considered to operate according to a power transfer management strategy. Such a strategy controls how power will be transferred, or how power transfer manager 634 will operate to manage power transfer. Operation to manage power transfer may include setting output lines to an active or inactive state (e.g., toggling a microprocessor I/O pin), or otherwise sending configuration controls to other circuits.

Power transfer manager 634 monitors the input power for power changes to determine how to control the operation of power transfer circuitry 632. Power transfer circuitry 632 is described above, and generally enables power extractor 630 to convert power from the sources into power to deliver to the loads. Note that with the ability to selectively couple and decouple sources and loads, power transfer manager 634 may include logic to adjust the power transfer according to any of a number of power transfer scenarios. Such ability enables dynamic system configuration changes while power extractor 630 maintains transfer efficiency. Power transfer manager 634 and power extractor 630 can dynamically and continuously adjust to system configurations, as well as continuously monitoring input and/or output power curves. The logic will account for the needs of the load(s), and the input of the source(s). In some embodiments, the needs of the loads can be determined by monitoring hardware. A simpler method is to include power profiles of the intended loads, which informs power transfer manager 634 how to control the output for particular loads. Power transfer manager 634 can identify which loads are present, and thus which profiles are applicable, based on load detection/monitoring, and/or via indication of a load by an external source (e.g., the load itself sends a signal such a triggering a load pin on a microprocessor, or a system management entity indicates which loads are present, etc.).

One inefficiency of traditional systems is the "always on" aspect to the switching supplies. That is, traditional power transfer technology consumed power even when the loads did not require power, and/or even when a source was not available. That is, some part of the power transfer circuitry was always consuming power. In some embodiments, power transfer manager 634 can automatically turn power extractor 630 on and off based on the presence of power and/or load. That is, for example, power transfer manager 634 may automatically enter a sleep state if the input power drops below a threshold (e.g., 1.0 mA at 5V). When the power is above the threshold, power transfer manager 634 may determine whether any loads are or should be connected. In the absence of source and/or load, power transfer manager 634 may not provide control signals, which results in no power transfer, or may produce signals to deactivate active circuitry. Power transfer manager 634 can be sophisticated and also or alternatively include a timer mechanism that enables the system to wake up after a period of time (e.g., 5 minutes) to re-check on the status of the system.

In some embodiments, the concepts of power management as embodied by power transfer manager 634 may be considered to include multiple aspects. For example, power management may include business rules and control, where each rule may control a different aspect of power control, or control the same power control aspect in a different manner. Business rules and control may be implemented as hardware, software, or some combination. The business rules may be broken down into planning rules, which are strategic rules that may look at impedance matching or monitor the power curve. Organizational rules may be tactical rules that determine how to deal with the multiple inputs and multiple outputs. The rules may provide and/or implement parameters that provide the particular functionality of power extractor 630. The control can implement actions or put into effect the business rules. For example, in some embodiments, impedance matching may match only a single power source. Selective matching would be performed for the input source that makes the most sense to match.

In some embodiments, determining how to transfer power to the loads or determining a power transfer strategy includes determining or identifying and selecting power distribution rules. The power transfer then occurs in accordance with the selected power distribution rule. Power distribution rules can be simple or complex, and may be generally classified as follows.

Hierarchical rules result in a simple precedence of one load over another. As source power fluctuates up and down, the power transferred to the loads may be to give preferential treatment to one load over the other. An example may be to favor the operational circuitry of a mission-critical device, while giving lower preference to a recharging one of several backup batteries.

Round robin rules institute a schedule for distributing power. For example, power can be distributed to one load for a period of time, then to another, then to another. Thus, all loads would receive some portion of distributed power in a given period of time. Allocation-based rules may institute fixed allocations for each load. For example, a system may allocate 80% of all distributed power to charging a main battery, leaving 20% for one or more other loads.

Time based rules allow the distribution of power to be based on the time of day, or time of week. For example, a system can be programmed with a sunrise/sunset schedule and have logic to determine peak sun hours. Thus, power may be expected to be at a peak from a solar panel at particular times of day. Based on the time of day, the system may distribute power according to one strategy or another. In another scenario, a system may have historical data that indicates peak load use. Power may be distributed at certain times of day according to the expected use. Note that as described below, peak input power and peak load may be actively determined and dynamically accounted for. Time based rules may then act as a framework for other rules to be applied. For example, during certain times of day, a round robin may be used, while a demand based strategy is employed at other times of day.

Functionality based rules enable the system to allocate power according to the load's functionality or purpose in the system. For example, in a pacemaker, the functional circuitry can be given priority over battery charging. Similarly, navigational equipment may be given a preferential treatment over cabin lights in an aircraft. Demand based rules can adjust the power transfer to be commensurate to demand of the loads. Demand based rules may require the addition of detection circuitry (not shown) in output coupling hardware 640. In some embodiments, power extractor 630 includes load balancing logic (hardware and/or software) to implement demand based rules. In some embodiments, command based rules can also be applied. That is, a central station or other control entity can provide a rule for how power should be distributed, which may override any other rules or conditions already in the system.

As already suggested, the power distribution rules can be applied consistently, or may be adjusted for any of a number of scenarios (change in demand, time of day, number/strength of power sources, etc.).

Power transfer manager 634 may include or have associated impedance control 635. Impedance control 635 may refer to hardware and software that matches the impedance of input coupling hardware 620 and/or output coupling hardware 640 with associated sources or loads, respectively. Techniques for impedance matching are described above, and will not be repeated here.

In some embodiments, power extractor 630 includes presentation logic 636. Presentation logic 636 may include hardware and software to generate status output and potentially user interface functionality for power extractor 630 or system 600. In some embodiments, presentation logic 636 is coupled to power extractor 630, and is not necessarily part of power extractor 630. In such implementations, the block presentation logic 636 may represent the coupling components to connect power extractor 630 to the presentation logic. Presentation logic 636 may provide operational status 662 to an entity outside power extractor 630. Examples include a heartbeat signal, or more detailed information about parameters and operations passed to other hardware. Presentation logic 636 may include display control capabilities that allow system 600 to generate textual and/or graphical representations to present to a user. In some embodiments, presentation logic 636 may include messages that indicate information on how to operate the system. For example, in a system reliant on solar power sources, presentation logic 636 may indicate that the user should find a light source to prevent shutdown of the machine due to loss of power. The skilled reader will understand that many other similar applications are possible.

In some embodiments, information is exchanged with an entity that is separate from system 600. Such an entity may be a management entity or central station, or some other entity. Transceiver 638 provides power extractor 630 with the ability to transmit and receive information. Transceiver 638 may transmit telemetry, which indicates operational status 662, such as where system 600 is located, what version of hardware/software is present, what memory is available, what configuration is currently on the system, how much battery power is left, etc. Transceiver 638 may receive algorithms, configuration parameters, power profiles, updated firmware, or other control information. Transceiver 638 may communicate via wired or wireless links, over networks or to single devices, and potentially provide secure communication.

Interface 660 is intended to represent a default interface that may couple power extractor 630 with any type of local circuitry, user input mechanisms, or other interface not explicitly discussed herein.

Figure 48:
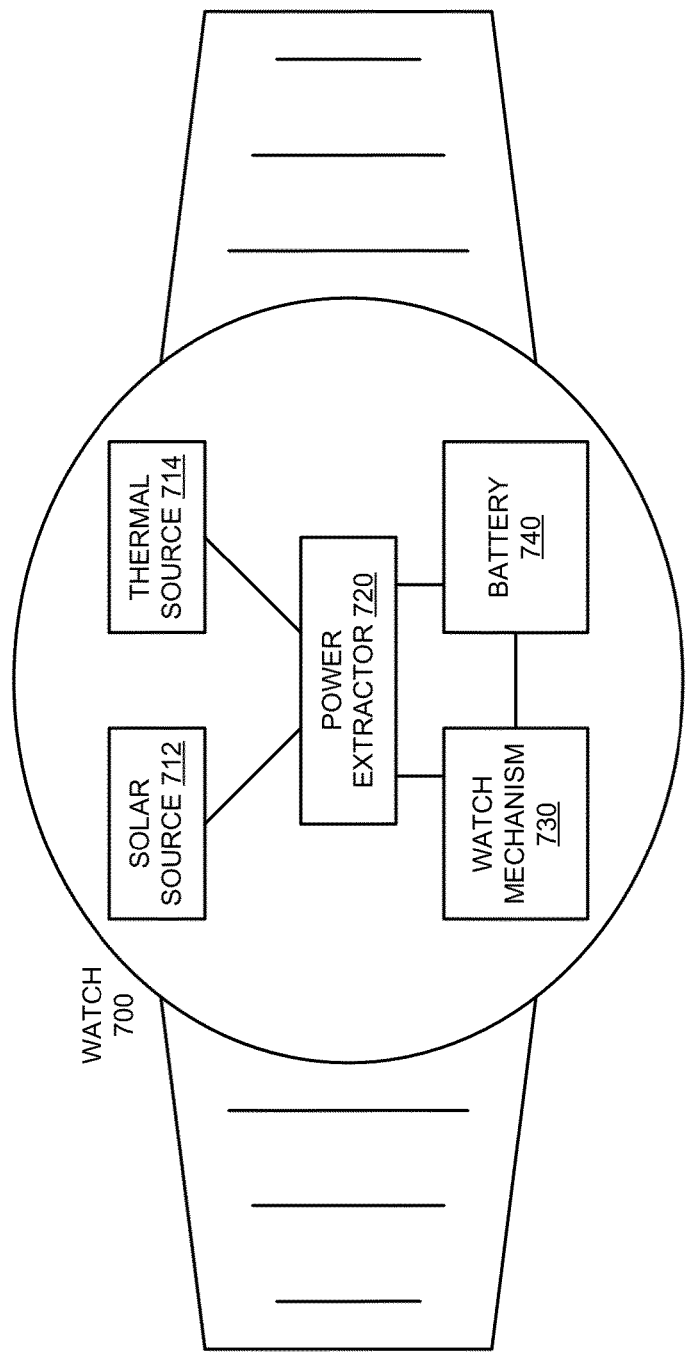
FIG. 48 illustrates a wristwatch system with multiple power sources, a power extractor, and multiple loads according to some embodiments.

FIG. 48 illustrates a wristwatch system with multiple power sources, a power extractor, and multiple loads according to some embodiments. Watch 700 represents a wristwatch that has two power sources, solar source 712 and thermal source 714. Solar source 712 may include solar panels on the face or body of the watch. When worn, the solar cells will provide power from ambient light. Thermal source 714 may be located on a distal side of the watch. Thus, when worn, the thermal source will be next to the wearer's arm and can generate energy from heat given off by the wearer. Neither source is a stable power source. There will not always be light present, and the wearer may take off the watch and thus remove the heat source (assuming "room temperature" heat is not a sufficient heat source).

Power extractor 720 receives power from both sources 712 and 714, which can then be transferred to multiple loads. In watch 700, one load is watch mechanism 730. The other load is battery 740. Watch mechanism 730 represents the inner mechanisms that allow the watch to keep time, calculate dates, perform stopwatch functions, store data, generate a display, move hands, or whatever other functionality is available from watch 700. Battery 740 is a rechargeable battery, and hence is a load. Power extractor 720 provides power to watch mechanism 730 from one or both of the power sources, when the power sources are available. At times when neither power source 712 nor 714 is available, battery 740 powers watch mechanism 730.

In some embodiments, watch mechanism 730 is a higher priority load than battery 740. That is, power extractor 720 first provides power to watch mechanism 730 before charging battery 740. In certain operating conditions, power sources 712-714 will provide more power than needed to operate watch mechanism 730, and power extractor 720 will charge battery 740. In an implementation where impedance matching is performed, power extractor 720 may select to impedance match to only a single load. In some embodiments, the highest priority available load will be impedance matched, and other loads will not be matched.

In some embodiments, power extractor 720 impedance matches to power sources 712-714. Power extractor 720 may only match a single source. In such an implementation, power extractor 720 may select to match impedance to the source with the greatest power input.

Both battery 740 and watch mechanism 730 will have associated power profiles. Along a similar line, both solar source 712 and thermal source 714 will have input power capacity. Consider that solar source 712 provides 0.3 W of power in good light conditions, and thermal source 714 provides 0.1 W for a total of 0.4 W. If watch mechanism 730 only requires 0.3 W of power, power extractor 720 may elect to turn off the connection to thermal source 714 when battery 740 does not require charging (e.g., its power level is greater than a threshold). In lower light levels perhaps solar source 712 drops to 0.25 W. Thus, power extractor 720 will connect thermal source 714 to make up the difference. If the combined sources fail to meet the needs of the watch mechanism, power extractor can choose to have the battery run the watch mechanism, and channel all input power to charging the battery. The flexibility of power extractor 720 provides the ability to apply power any of a number of different scenarios.

In furtherance of the discussion of rules above, in some embodiments, watch 700 includes a dynamic power distribution strategy. For example, a dynamic hierarchy may be used. Such an implementation could operate as follows: when neither source 712 nor source 714 is available, run the watch off battery 740; when the thermal source is available, run watch mechanism 730 off thermal source 714; when solar source 712 and thermal source 714 are both active, run watch mechanism 730 off the thermal source, and charge battery 740 with solar source 712. Other scenarios could be employed.

Figure 49:
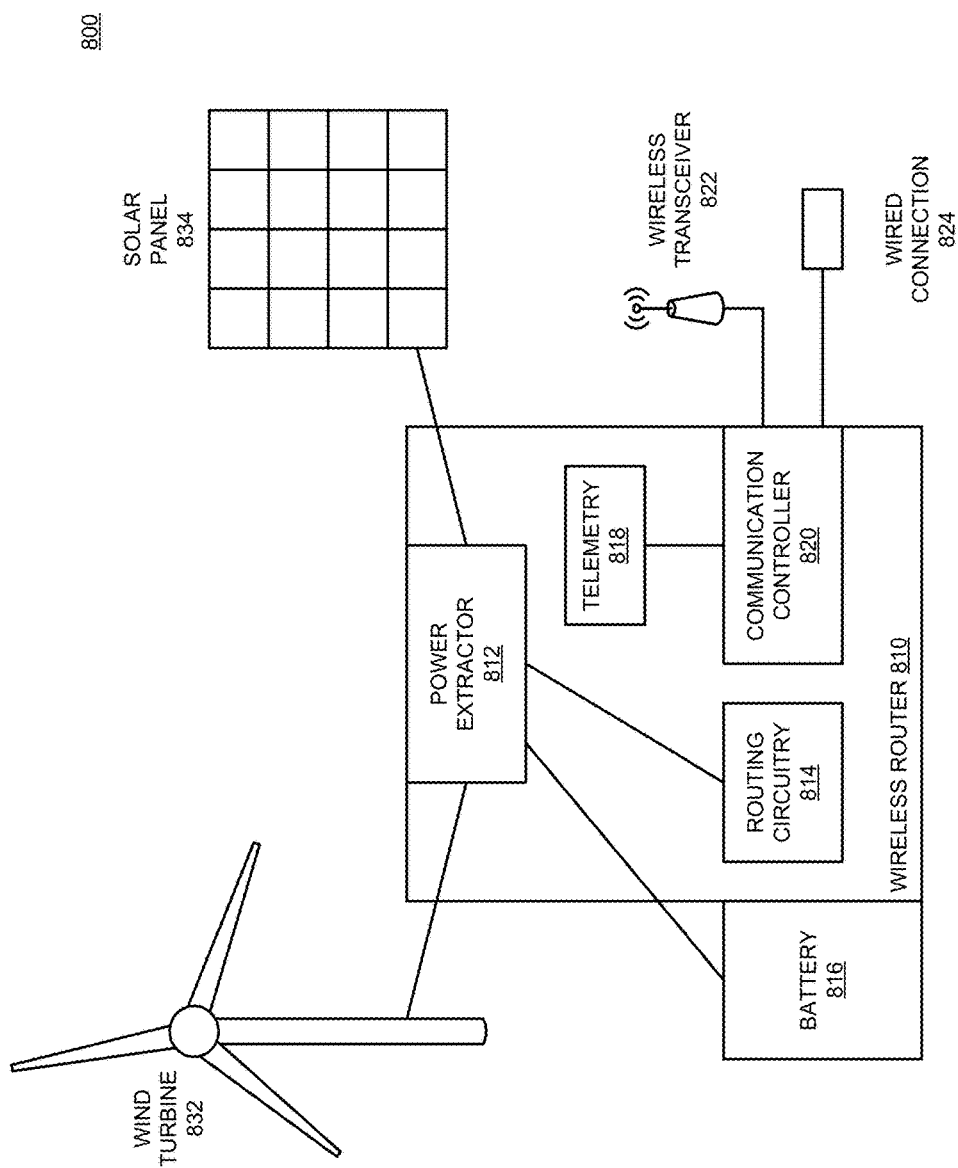
FIG. 49 illustrates a wireless router system with multiple power sources, a power extractor, and multiple loads according to some embodiments.

FIG. 49 illustrates a wireless router system with multiple power sources, a power extractor, and multiple loads according to some embodiments. System 800 illustrates wireless router 810 with power extractor 812 coupled to two power sources, wind turbine 832, and solar panel 834. Power extractor 812 selectively transfers power from power sources 832-834 to the circuitry of wireless route 810, such as routing circuitry 814, and to battery 816. Routing circuitry represents the functional circuitry of wireless router 810. Functional circuitry converts power into useful work. Specifically, wireless router 810 provides networking functionality to wireless communication devices.

Consider that power extractor 812 includes a power profile for routing circuitry 814. A power profile as described herein can be a dynamic profile. That is, the power profile may be dependent upon certain conditions. For example, wireless router 810 may be more frequently accessed at peak daytime hours, or in the evenings, for example. During the middle of the night, or in the middle of the day, there may be much less demand for routing services. Thus, the profile may specify business rules to use that vary with the time of day and/or the activity of the device. In an implementation where load priorities are established, the priorities may be switched under certain circumstances.

For example, if wireless router 810 experiences less traffic during high sunlight times when the most efficient use of solar panel 834 could take place, the priority may be to use solar panel 834 to charge battery 816. In some embodiments, battery 816 includes multiple battery technologies. A power profile for battery 816 may include rules that indicate how power extractor should transfer power to the components of the battery, which may each be considered separate loads. For example, peak sun hours may be better for charging a lead-acid battery (e.g., a main battery), and off-peak hours be better for charging a Ni-Cad battery (e.g., a backup battery).

System 800 thus illustrates the use of various sources and various loads. At least one of the loads may be complex, or consist of multiple loads. Also illustrated is the concept of complex power profiles. Additionally, in some embodiments, wireless router 810 includes telemetry 818, which represents data about the operational status of wireless router 810. Communication controller 820 may be employed to communicate telemetry 818 to a remote or separate entity. Communication controller 820 may also receive data from the separate entity. Communication controller 820 may operate via wireless transceiver 822 and/or wired connection 824. Wireless and wired communication technologies are common, and understood by those skilled in the art. Any suitable communication medium and technology can be employed.

Figure 50:
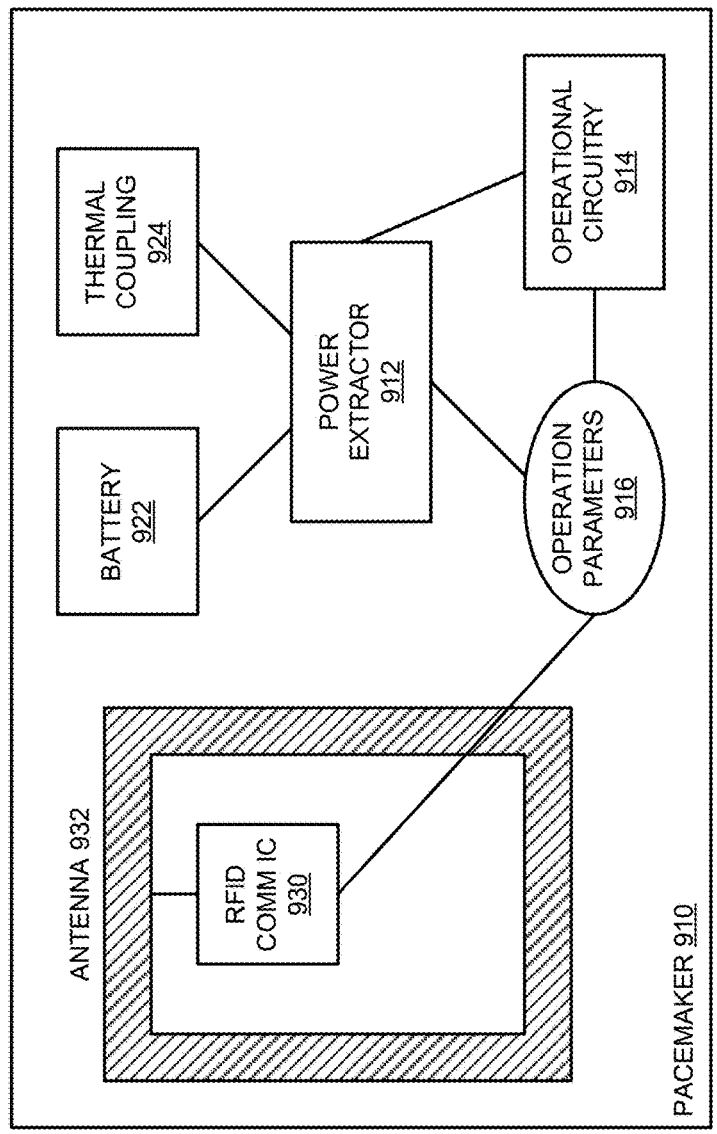
FIG. 50 illustrates a pacemaker system with multiple power sources, a power extractor, and a load according to some embodiments.

FIG. 50 illustrates a pacemaker system with multiple power sources, a power extractor, and a load according to some embodiments. Pacemaker 910 illustrates a system with multiple power sources and a single load. Any combination of numbers of sources and loads can be used, depending on what makes sense for a given application.

Pacemaker 910 includes power extractor 912, coupled to two power sources, battery 922 and thermal coupling 924. Business rules may indicate to use thermal coupling 924 as much as possible, or use it constantly to trickle charge battery 922 constantly, or some other scenario. Power extractor 912 transfers power from one or both sources to operational circuitry 914, which performs the functionality of pacemaker 910.

Pacemaker 910 includes operation parameters 916, which represents data that indicates the state of the pacemaker, which may include critical information about how the machine is operating, and whether it is effective, whether it needs service, etc. Operation parameters 916 may also include information (e.g., configuration, rules) related to the operation of power extractor 912. Thus, power extractor 912 may obtain data from operation parameters 916 for execution. In some embodiments, such information is transmitted or received via a passive wireless communications system (e.g., radio frequency identifier (RFID) technology).

Pacemaker 910 includes RFID communication integrated circuit (comm IC) 930. IC 930 controls antenna 932, including generating messages to be sent via antenna 932, and receiving and processing signals received via antenna 932. Typical operation of a circuit such as shown with RFID communication IC 930 and antenna 932 would be as follows. An electromagnetic (EM) wave is generated in close proximity to pacemaker 910 (e.g., inches or feet). The EM wave impinges antenna 932, which then generates charge and creates energy potential. IC 930 stores the energy potential (e.g., in a capacitor) and draws on the potential to power the IC. The IC then generates a message from operation parameters 916 and transmits the message. In the receive case, IC 930 receives and processes a message and stores one or more items in operation parameters 916 for use by power extractor 912.

Figure 51:
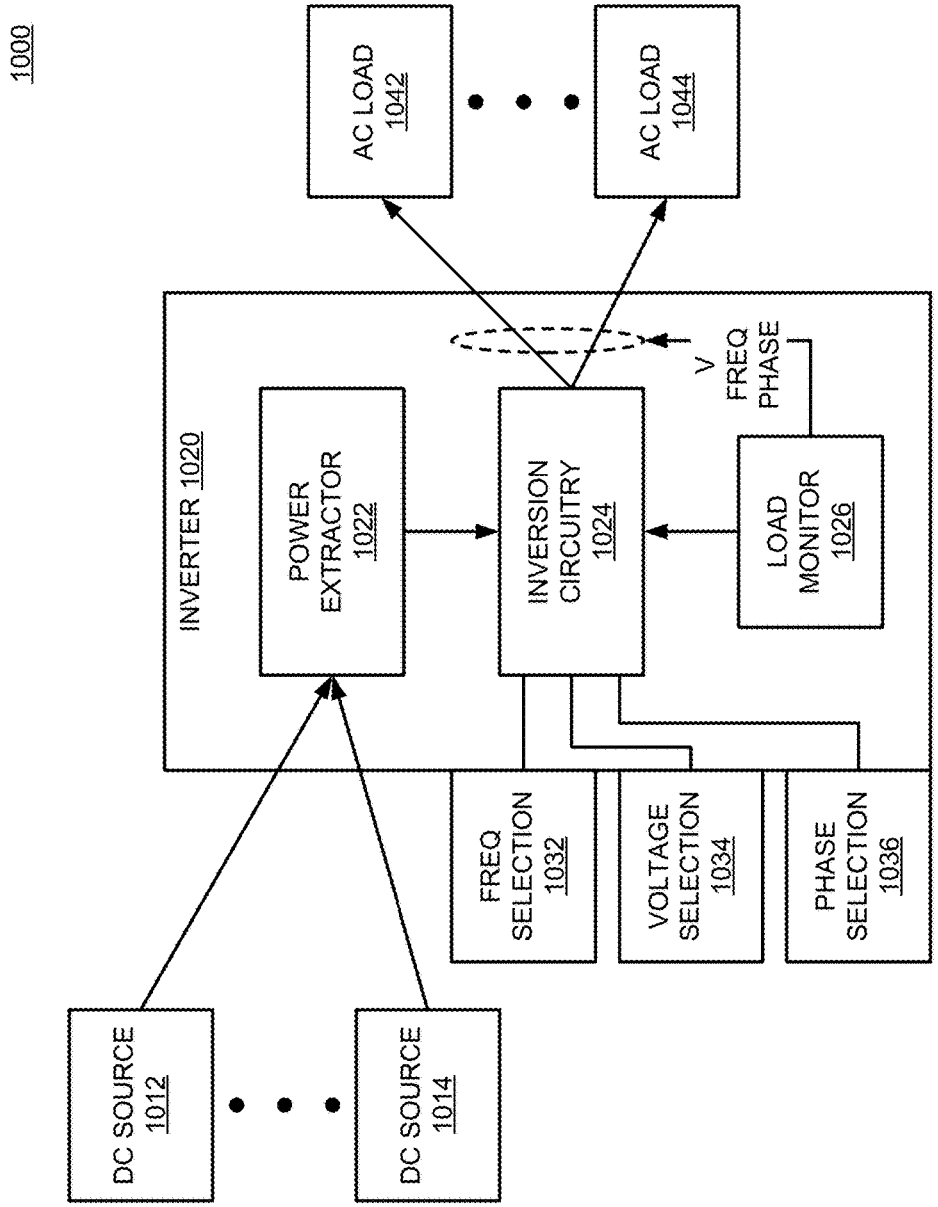
FIG. 51 illustrates a system with multiple power sources, a power extractor, and multiple AC loads according to some embodiments.

FIG. 51 illustrates a system with multiple power sources, a power extractor, and multiple AC loads according to some embodiments. System 1000 represents a power transfer system having an inverter. As understood in the art, an inverter is an electronic device or system that produces alternating current (AC) from direct current (DC). Generally the DC to AC conversion is accomplished as a conversion of square-wave DC current to sinusoidal AC current. The inverter is generally the critical component in traditional photovoltaic (PV) and other renewable energy systems seeing it is responsible for the control of electricity flow between these energy systems and various electrical loads. The inverter performs the conversion of the variable DC source to a clean 50-60 Hz sinusoidal alternating current (AC). Inverters also perform maximum power point tracking (MPPT) ostensibly to keep power generation as efficient as possible. An inverter as described herein may also have a communications interface to a central station for the transmission of statistics and alerts.

As illustrated, power extractor 1022 may be a component of inverter 1020. That is, the inverter system may include a power extractor as the power transfer element. System 1000 includes one or more DC sources 1012-1014, which can be dynamically coupled and decoupled to power extractor 1022 to provide the DC current. The operation of power extractor 1022 may be identical to embodiments already described herein. The difference in system 1000 over what is previously described is that the consumer of the output of power extractor 1022 is inversion circuitry 1024. One or multiple AC loads 1042-1044 may be selectively, dynamically coupled and decoupled to inverter 1020 to receive power from inversion circuitry 1024.

Inversion circuitry 1024 generally converts the efficiently-transferred output power of power extractor 1022 and converts and filters the power in an efficient manner. The result is an inverter of much higher efficiency than systems implemented with traditional technologies. Discussions above with regards to power distribution strategy, distributing power to one or more loads, etc., applies equally well to system 1000 as it does to the embodiments mentioned above. The difference is that the loads consume AC power rather than DC power. Similar issues of monitoring output power will be applied in inversion circuitry 1024 as are performed in power extractor 1022. The mechanisms for monitoring the power output may be different in inversion circuitry 1024 than that of power extractor 1022.

Inversion circuitry 1024 is an algorithmically operated non-linear current mode power converter. Inverter 1020, via inversion circuitry 1024, uses a geometric structure or topology to perform its current switching from output provided by power extractor 1022. The current switching topology technology converts DC power into AC power under microprocessor control. The microprocessor may be a separate microprocessor than what may be employed in power extractor 1022. The load requirements of AC loads 1042-1044 for voltage, frequency, and/or phase may be sensed under software control and thereby implemented to a desired voltage, frequency, and/or phase. Alternatively, or additionally (for example, as an override), the load requirements for voltage, frequency, and/or phase may be configuration controlled.

Load monitor 1026 represents one or more components, whether hardware, software, or a combination (e.g., hardware with installed firmware control), which monitors the output of inversion circuitry 1024 for voltage (V), frequency (FREQ), and/or phase. Based on what is detected, and/or based on rules or external input, load monitor 1026 can provide configuration to inversion circuitry 1024. Note that even when load monitor 1026 is implemented in hardware, its input into inversion circuitry 1024 can be considered "software control" if input into a microprocessor of inversion circuitry 1024. Load monitor 1026 may also include a communication connection (not shown) to, for example, a central station that sends configuration parameters that are passed to inversion circuitry 1024.

Additionally, or alternatively, to load monitor 1026, inverter 1020 may include more "manual" configuration mechanisms. Such configuration mechanisms may include switches (for example, commonly used configuration "DIP" (dual in-line package) switches. Other switches or comparable mechanisms could also be used. DIP switches typically have a row of sliders or rockers (or even screw-type rotational mechanisms) that can be set to one or another position. Each switch position may configure a different item, or the composite of all the switch positions can provide a binary "number" input to a microprocessor. Frequency selection 1032 represents a configuration mechanism to set the output frequency of inverter 1020. Voltage selection 1034 can be used to select the output voltage of inverter 1020. Phase selection 1036 can be used to select the output phase of inverter 1020. The use of frequency selection 1032, voltage selection 1034, and phase selection 1036 can enable inverter 1020 to operate correctly even in cases where voltage, frequency, or phase information is provided incorrectly from a grid on which inverter 1020 operates.

The background section of this disclosure provides various detailed information which is believed to be correct, but which may inadvertently include some errors. These errors, if they exist, would in no way detract from the inventions described and claimed herein. The Detailed Description section may also include some inadvertent errors which would not detract from the invention. Further, the Detailed Description section includes some theoretical explanations of the operation of the illustrated power extractor. It is believed that these theoretical explanations are correct, but if they are partially incorrect that would not detract from what is an enabling disclosure or detract from the inventions described and claimed.

It will be appreciated that the figures include block diagrams and schematic representations that may be implemented in a variety of ways and that actual implementations may include various additional components and conductors.

As used herein, the term "embodiment" refers to an implementation of some aspect of the inventions. Reference in the specification to "an embodiment," "one embodiment," "some embodiments," or "other embodiments" means that a particular feature, circuitry, or characteristic is included in at least some embodiments, but not necessarily all embodiments. Different references to "some embodiments" do not necessarily refer to the same "some embodiments."

When it is said the element "A" is coupled to element "B," element A may be directly coupled to element B or be indirectly coupled through, for example, element C. When the specification or claims state that a component, feature, circuit, structure, process, or characteristic A is in response to a component, feature, circuit, structure, process, or characteristic B, it merely means that A is at least partially responsive to B (but may also be responsive to C, or B and C at the same time). That is, when it is said A is in response to B, A could be in response to B and C at the same time. Likewise, when it is said that A causes B, A is at least a partial cause of B, but there could be other causes of B either separately or in combination with A.

If the specification states a component, feature, structure, circuitry, or characteristic "may", "might", or "could" be included, that particular component, feature, circuitry, or characteristic is not required to be included. If the specification or claim refers to "a" structure, that does not mean there is only one of the structure.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured by reference to the claims that follow.

What is claimed is:

1. An apparatus to transfer energy from a source to a load, comprising:
   an input port to connect to an energy source;
   an output port to connect to a load; and
   a power extractor to transfer energy from the energy source to the load, the power extractor including
     a first transformer including one end of a primary winding coupled to the input port and the other end of the primary winding coupled to a node via a first capacitor; and
     a second transformer including one end of a primary winding coupled to the output port and the other end of the primary winding coupled to the node via a second capacitor; and wherein the node is coupled through the first transformer secondary winding to circuit ground, and the node is coupled through the second transformer secondary winding to circuit ground, and wherein the power extractor is configured to switch the other end of the primary winding of the first transformer and the other end of the primary winding of the second transformer in accordance with a power change detection at the input port.

2. The apparatus of claim 1, wherein the input port is to connect to multiple energy sources.

3. The apparatus of claim 1, wherein the output port is to connect to multiple loads.

4. The apparatus of claim 1, further comprising:
a slope detection circuit coupled to the input node to detect a slope of instantaneous power changes at the energy source;
wherein the power extractor is to control switching based on the detected slope.

5. The apparatus of claim 1, further comprising:
first switching control coupled between the first transformer primary winding and the first capacitor; and
second switching control coupled between the second transformer primary winding and the second capacitor.

6. The apparatus of claim 5, where the first and second switching control alter a duty cycle of the switching based on the detected slope.

7. The apparatus of claim 5, wherein the first and second switching control comprise complementary switching control signals, wherein when the first switching control closes its switch, the second switching control opens its switch, and when the first switching control opens its switch, the second switching control closes its switch.

8. A method for transferring energy from an energy source to a load, comprising:
receiving energy from the energy source at one end of a primary winding of a first transformer;
transferring the received energy via the primary winding of the first transformer to a first capacitor coupled between the other end of the primary winding of the first transformer and a node, and through the node to a second capacitor coupled between the node and one end of a primary winding of a second transformer, wherein the node is coupled through the first transformer secondary winding to circuit ground, and the node is coupled through the second transformer secondary winding to circuit ground; including
switching the first capacitor between the primary winding of the first transformer and circuit ground; and
switching the second capacitor between the primary winding of the second transformer and circuit ground; and
outputting energy to the load via the other end of the primary winding of the second transformer.

9. The method of claim 8, wherein receiving energy from the energy source comprises receiving energy from multiple energy sources.

10. The method of claim 8, wherein outputting energy to the load comprises outputting energy to multiple loads.

11. The method of claim 8, further comprising:
detecting a slope of instantaneous power changes at the energy source prior to the primary winding of the first transformer;
wherein switching the first and second capacitors comprises switching the capacitors based on the detected slope.

12. The method of claim 11, further comprising:
altering a duty cycle of switching the first or second capacitors based on the detected slope.

13. The method of claim 8, wherein switching the first and second capacitors comprises switching the second capacitor complementary to the first capacitor, wherein when the first capacitor is switched to the first transformer primary winding when the second capacitor is switched to ground, and when the first capacitor is switched to ground the second capacitor is switch to the second transformer primary winding.

* * * * *